(12) United States Patent
Tsang et al.

(10) Patent No.: US 7,773,591 B2
(45) Date of Patent: Aug. 10, 2010

(54) INTEGRATED MEMORY FOR STORING EGRESSING PACKET DATA, REPLAY DATA AND TO-BE EGRESSED DATA

(75) Inventors: Siukwin Tsang, Daly City, CA (US); Peter Onufryk, Flanders, NJ (US)

(73) Assignee: Integrated Device Technology, inc., San Jose, CA (US)

( * ) Notice: Subject to any disclaimer, the term of this patent is extended or adjusted under 35 U.S.C. 154(b) by 465 days.

(21) Appl. No.: 11/774,457

(22) Filed: Jul. 6, 2007

(65) Prior Publication Data

US 2009/0010252 A1     Jan. 8, 2009

(51) Int. Cl.
    H04L 12/50    (2006.01)
(52) U.S. Cl. .............. 370/379; 370/60.1; 370/94.2; 370/236; 370/413; 370/468
(58) Field of Classification Search .............. 370/60.1, 370/94.2, 229, 230, 236, 379, 395, 398, 465, 370/468, 412, 413, 415, 416
    See application file for complete search history.

(56) References Cited

U.S. PATENT DOCUMENTS

| | | | |
|---|---|---|---|
| 5,790,522 A * | 8/1998 | Fichou et al. ............... | 370/236 |
| 5,842,224 A | 11/1998 | Fenner | |
| 5,987,008 A * | 11/1999 | Simpson et al. ............. | 370/236 |
| 6,499,079 B1 | 12/2002 | Gulick | |
| 6,519,225 B1 * | 2/2003 | Angle et al. ................ | 370/229 |
| 6,570,877 B1 | 5/2003 | Kloth et al. | |
| 6,654,381 B2 * | 11/2003 | Dally et al. ................. | 370/412 |
| 6,661,788 B2 * | 12/2003 | Angle et al. ................ | 370/390 |
| 6,738,371 B1 | 5/2004 | Ayres | |
| 6,850,490 B1 | 2/2005 | Woo et al. | |
| 6,888,831 B1 * | 5/2005 | Hospodor et al. ........... | 370/394 |
| 6,898,182 B1 | 5/2005 | Cloonan | |
| 6,954,424 B2 * | 10/2005 | Barrack et al. .............. | 370/229 |
| 7,426,185 B1 * | 9/2008 | Musacchio et al. ........ | 370/235.1 |
| 7,480,246 B2 * | 1/2009 | Agarwal et al. ............. | 370/235 |

(Continued)

*Primary Examiner*—Ayaz R Sheikh
*Assistant Examiner*—Andrew C Lee
(74) *Attorney, Agent, or Firm*—Tracy Parris

(57) ABSTRACT

An integrated egress/replay memory structure is provided with split rate write and read ports and means for managing at least three types of data moving into, through and/or out of the integrated memory structure, namely: (1) currently egressing packet data; (2) replay data; and (3) to-be egressed data. Additionally, a shared free space (4) is managed between the storage areas of the (2) replay data and (3) the to-be egressed data. The to-be egressed data (PdBx) is allowed to enter into (to be written into) a front-end raceway portion of the integrated memory structure at a rate which can be substantially greater than that allowed for corresponding egressing packet data (PdUx). Thus, even when egressing packet data that is ahead in line is shifting out toward a slow rate egress port, this slowing factor does not slow the speed at which the to-be egressed data (PdBx) can be shifted into the front-end raceway portion. A shared free space memory area is maintained between the storage areas of the replay data (PdAx) and to-be-egressed data (PdBx). When a positive acknowledgement (ACK) is received from the destination of already-egressed data (of the After-Transmission Data, or PdAx), the corresponding replay storage area (the area storing the acknowledged PdAx data) can be reallocated for use as an empty part of the raceway portion.

29 Claims, 4 Drawing Sheets

U.S. PATENT DOCUMENTS

| | | | |
|---|---|---|---|
| 7,522,624 B2 * | 4/2009 | Barri et al. | 370/413 |
| 2002/0146037 A1 | 10/2002 | Sugaya et al. | |
| 2003/0196025 A1 | 10/2003 | Dahlen et al. | |
| 2004/0066673 A1 | 4/2004 | Perego et al. | |
| 2005/0034049 A1 | 2/2005 | Nemawarkar et al. | |
| 2006/0017497 A1 | 1/2006 | Mo et al. | |
| 2006/0018170 A1 | 1/2006 | Au et al. | |
| 2006/0018176 A1 | 1/2006 | Au et al. | |
| 2006/0018177 A1 | 1/2006 | Au et al. | |
| 2006/0020742 A1 | 1/2006 | Au et al. | |
| 2006/0020743 A1 | 1/2006 | Au et al. | |
| 2006/0020761 A1 | 1/2006 | Au et al. | |
| 2006/0109789 A1 | 5/2006 | Skeritt | |
| 2008/0109570 A1 | 5/2008 | Leonard et al. | |
| 2008/0126571 A1 | 5/2008 | Leonard et al. | |

* cited by examiner

INTEGRATED MEMORY FOR STORING EGRESSING PACKET DATA, REPLAY DATA AND TO-BE EGRESSED DATA

FIELD OF DISCLOSURE

The present disclosure of invention relates generally to networks that transmit information in packet format. The disclosure relates more specifically to systems and network devices that can employ ingress and egress flow rates of differing values for different communication channels and yet more specifically to a head-of-line blocking problem which may occur in such multi-rate systems and to a delayed nullification notice defect which may also arise in such multi-rate systems.

CROSS REFERENCE TO CO-OWNED APPLICATION

The following copending U.S. patent application is owned by the owner of the present application, and its disclosure is incorporated herein by reference:

(A) Ser. No. 11/390,754 filed Mar. 28, 2006 by Nadim Shaikli and originally entitled, "Packets Transfer Device Having Data Absorbing Buffers with Elastic Buffer Capacities".

DESCRIPTION OF RELATED ART

Use of digitally-encoded packets in data communication and network systems is well known. Typically each packet signal that is being transmitted over a network link is layered like an onion to have header-type outer shell sections, a payload or message core section and one or more error correction sections that cover various parts of the core or outer shells. Packets may be transmitted individually or as parts of relatively continuous streams or bursts depending on quality of service requirements and/or availability of transmission links. When packet signals are transmitted from a source device to a receiving device, the packet signals that arrive at the receiving device typically progress within the receiving device through a physical interface layer (PL—e.g., one including a SERDES interface), and then through one or both of a data link layer (DL) and a transaction layer (TL). The physical interface layer (PL) may include means for serializing and deserializing data signals (SERDES) and means for recognizing the start and end of each ingressing packet. The data link layer (DL) may include means for managing error checking, error correction (e.g., CRC, ECC, etc.) and/or managing packet ordering and verifying completion of sequences of interrelated packets. Among the functions normally included in the DL is that of verifying that an egress side link partner (a receiving device) correctly received a transmission sent from the DL of a current source device. The transaction layer (TL) may include means for parsing (peeling the onion skin layers of) different parts of each kind of post-DL packet so as to get to desired portions of the payload data or message data for respective processing. Specific processing of TL output data may be carried out by a so-called, File Data Processing Layer. Before it is sent to the File Data Processing Layer, payload and/or message data from sequentially ingressing packets may sometimes need to be reordered for purposes of reconstructing an original data sequence different from the ingress sequence, where the original data sequence may, for example, be required for reconstituting a rasterized graphic image. To this end, unique sequence numbers are often embedded in successive ones of ingressing or egressing packets so that desired ordering of data can be achieved in the receiving device even though some packets may have arrived out of order, for example due to link error and subsequent replay (re-transmission) of an error-infected one or more packets.

Packet signals leaving a source device typically progress in the reverse order within the source device, namely, first by moving outgoing payload data from the file layer of the device and through the transaction layer (TL) of the device for attachment of transaction control code to the file layer code, then through the data link layer (DL) for attachment of code such as sequence number code and error check code thereto, and finally through the sender's physical interface layer (PL) for encoding into a predefined serial transmission format and for output onto a physical transmission media (e.g., a high frequency cable or printed circuit strip or an optical fiber or wireless transmission in some cases).

Because an egressing packet may fail to reach its targeted destination (i.e., its link partner) intact for any of a number of reasons (i.e., noise on the link flips one or more bits and thus induces error), a backup copy of each egressing packet is often temporarily stored in a retry buffer (RB) located in the DL layer of the source device for a short while. If the destination device sends a retry request (i.e., a NAK signal such as a NAK data link packet) and/or fails to timely acknowledge receipt, the backup copy is resent (replayed) from the retry buffer (replay buffer).

A common design configuration structures each retry buffer as a one speed buffer. Packet data (Pd) $151b$ that is being transmitted out of the egress port (i.e., $171$) advances through a short rate-matching FIFO $151a$ and then through a data-copying structure $151h$ and a multiplexer $151c$ on it way out to the corresponding egress port (i.e., $171$). The average advancement rate of this "being-transmitted" data signal $151b$ (also described here as "under transmission" or Ux signal) through the rate-matching FIFO $151a$ matches the egress rate (i.e., 1 B/cc) out of the corresponding egress port (i.e., $171$). The rate-matching FIFO $151a$ merely smoothes out any burstiness that might be present when the data comes out of the switch fabric $150$. The data-copying structure $151h$ copies passing through data $151b$ into a replay-storing memory buffer $151d$. Data stored in buffer $151d$ may be referred to as packet data after transmission, or PdAx. If a negative acknowledge signal (NAK) later comes back from the link partner of port $171$, a copy of the backup data that had been saved in the replay-storage memory $151d$ is output therefrom at the port's egress rate (without yet emptying out the replay memory $151d$). When a positive acknowledge signal (ACK) comes back from the link partner, the original backup data that had been saved in the replay-storing memory $151d$ is erased thus freeing up space in the replay buffer $151d$ a next stream of "being-transmitted" packet data (PdUx) to be copied into the replay-storage memory $151d$ to thereby become replay backup data (PdAx).

Two back pressuring structures, $151f$ and $151g$, are shown associated with the rate-matching FIFO $151a$ and the replay-storing memory $151d$. The first back pressuring structure $151f$ sends back pressure signals to dispatch scheduler $170$ if the corresponding rate-matching FIFO $151a$ fills to beyond a predefined safe capacity. The second back pressuring structure $151g$ sends back pressure signals to replay controller $155$ if the corresponding replay buffer memory $151d$ fills to beyond a predefined safe capacity.

A problem known as head-of-line blocking can develop as follows. If a first-in-queue packet is to egress out of a slow egress port and a next-in-queue packet is scheduled to egress next out of, for example, a faster second egress port (where that second egress port could possibly one that is empty because it ran out of packet data and thus the second port uselessly idling), the next-in-queue packet must wait for the slower packet to finish moving out first at its port-dictated slow rate before the next-in-queue packet has its turn. The slower packet steps out at its relatively slow rate into and through the "being-transmitted" rate-matching FIFO 151*a* and through copier 151*h* for copying into respective replay buffer memory 151*d*, and only then, when the end of the slower packet has cleared out of the ingress-side queue 131, can the next-in-queue packet move out at its faster rate to and through its respective replay buffer structure (e.g., 152) for egress through its respective and faster destination port (which second port 172 could have been empty and uselessly idling up until now). In other words, the slowest tortoise in the queue delays all the hares (rabbits) waiting behind him. It is to be understood that this problem regarding head-of-line blocking is not limited to situations where the second-in-queue packet is going to the fastest egress port and the first-in-queue packet is going to the slowest egress port. That is an extreme situation. The problem is present to one degree or another any time a first-in-queue packet is heading towards a relatively slow egress port and there are one or more next-in-queue packets being held up by the slowness of egress of the first-in-queue packet. Network efficiency is decreased when the head-of-line blocking problem prevents or slows down the rate at which currently empty egress ports (and thus uselessly idling egress ports as well as their associated network links) are supplied with new data.

A related drawback of systems such as the one (100) shown to allow for variable egress rates may be termed as a late notification of nullity defect. Error checking conventionally does not take place until the last part (115*c*) of a packet ingresses into an ingress receiving side (i.e., ingress buffer) of a packet processing device. If an error infected packet happens to be of a slow tortoise variety due to the relative slowness of its destination link (in other words, because it is being routed out through an egress pipe of narrow bandwidth) the report regarding detection of error at the end of that slow moving packet does not get relayed through the routing fabric (e.g., switch fabric) and to the egress side of the device any faster than the rate of the relatively narrow egress pipe. Thus, even though knowledge of the error might exist at the ingress side, that information is not immediately relayed to the egress side, but instead waits till the tail end remainder (115*c*) of the slow tortoise packet makes its way across the routing fabric to the egress side. This is generally not recognized as being a defect, but it is one, as shall become apparent from the following detailed discussion.

SUMMARY

Structures and methods may be provided in accordance with the present disclosure of invention for improving over one or more of the above-described, head-of-line blocking problem and slow notice of nullification defect.

In one embodiment, an integrated egress/replay memory structure is provided with split rate write and read ports and means for managing at least three types of data moving into, through and/or out of the integrated memory structure, namely: (1) egressing packet data—also referred to herein as PdUx; (2) replay data that is temporarily saved "After" transmission—also referred to herein as PdAx; and (3) to-be egressed packet data that is saved "Before" transmission—also referred to herein as PdBx. Additionally, a shared free space (4) is managed between the storage areas of the (2) replay data—the PdAx and (3) to-be egressed data—the PdBx. The to-be egressed packet data (PdBx) is allowed to enter into (to be written into) a front-end raceway portion of the integrated memory structure at a rate which can be substantially greater than that allowed for egressing packet data (PdUx). Thus, even when egressing packet data that is ahead in line is shifting out toward a slow rate egress port, this slowing factor does not slow the speed at which the to-be egressed data (PdBx) can be shifted into and saved in the front-end raceway portion. A shared free space memory area is maintained between the storage areas of the replay packet data (PdAx) and to-be-egressed packet data (PdBx). When a positive acknowledgement (ACK) is received from the destination of already-egressed data (of the "After"-Transmission Packet Data, or PdAx), the corresponding replay storage area (the area storing the acknowledged PdAx) can be erased (optional) and reallocated for use as an empty part of the raceway portion, thereby increasing the length of the raceway portion and allowing more to-be-egressed data (PdBx=Packet Data "Before" Transmission) to enter into the raceway portion at relatively high speed. Also, if to-be-egressed-but-subsequently-nullified data (null-PdBx) enters into the raceway portion, the corresponding raceway storage area can be erased (optional) and reallocated for use as an empty part of the raceway portion even before such garbage PdBx material is allowed to egress, thereby increasing the empty length of the raceway portion and allowing yet more to-be egressed data (which subsequent PdBx is typically not nullified) to enter into the raceway portion at relatively high speed. This high speed write-in option helps to alleviate a head-of-line blocking problem that may otherwise arise in ingress-side FIFO's as shall be seen from the below detailed description.

An ancillary benefit to having rapid ingress through the switch fabric despite the fact that the egress bandwidth may be much slower is that notification of error in an ingressing packet gets through to the egress side much quicker; and then an early termination of transmission may be effected at the egress side.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
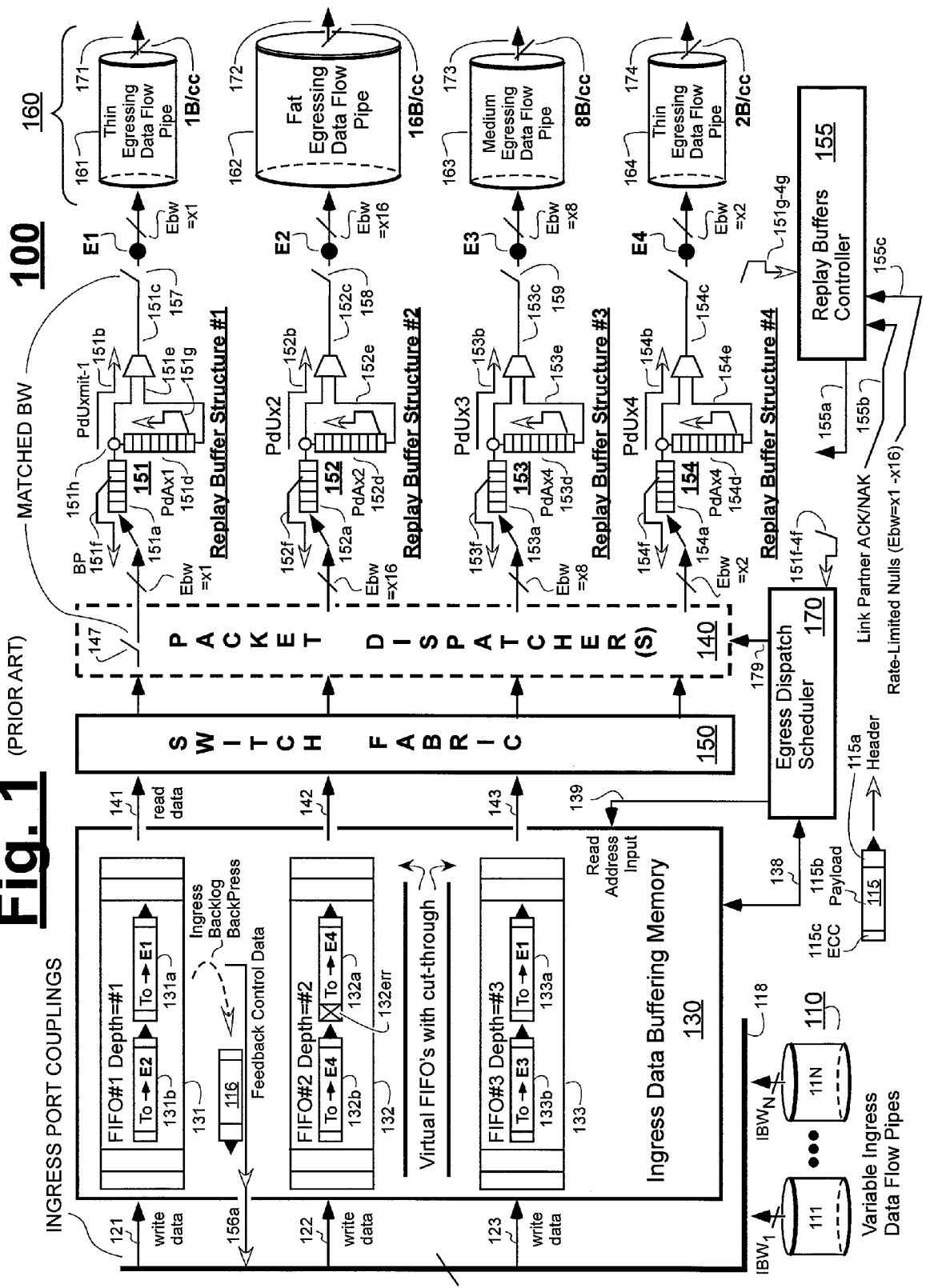
FIG. 1 is a block diagram of a conventional packet switching system with the to-fabric dispatcher drawn out of place to help explain a root cause of a head-of-line blocking problem.

FIG. 1 is a block diagram of a conventional packet switching device 100 that may be embedded within a network or communications system (not explicitly shown) for selectively routing packets between 3 or more ports of the device (i.e., ports 171-174). The conventional packet switching device 100 has a packet data dispatching unit 140 which is intentionally drawn out of its actual position in the illustrated circuitry so as to help explain a root cause of a head-of-line blocking problem that may occur for example between packets 131a and 131b of an ingress FIFO 131. Details regarding this head-of-line blocking problem will be provided shortly.

Major sections of the illustrated device 100 are: a plurality of ingress data pipes (110, optionally with each having a variable ingress rate); an ingress data buffering memory (130); a switch fabric (a packet routing fabric, 150); a plurality of replay buffers (151-154); and a plurality of egress data pipes (160) coupling to a respective set of I/O ports 171-174. At least the egress data pipes 160 are of a variable bandwidth type. Typically the ingress data pipes 110 will also be of a variable bandwidth type, and in typical cases the ingress data pipes 110 and egress data pipes 160 will pairwise share respective bidirectional I/O ports. Alternatively, the egress ports 171-174 may be unidirectional output ports.

Packet data that is ingressing into a data receiving part of the device 100 will typically get routed into a parallel set of ingress buffers (e.g., First-In, First-Out buffers) 131-133 before being further processed and then being output via one or more egress pipes 161-164 to respective ports 171-174. The ingress buffers 131-133 act somewhat like shock absorbers in that each absorbs and smoothes out the often-bursty nature of ingressing packet streams on each respective channel of ingressing data and then the respective FIFO stores the data until the ingressed data is ready to be processed (i.e., dispatched through the switch fabric 150) and thereafter egressed. Such a shock absorbing operation does not however, alter the average rate at which packet data enters each given ingress buffer 131-133. Ingress rate is generally controlled by the link partner (not shown) at the ingress side and by back pressure or credit tokens sent back in return-flow packet s (116) to the link partner from the data receiving device (100) based on the amount of free space available in its ingress buffer 131-133. A conventional paradigm configures all the ingress receiving buffers of a communications device (i.e., 100) to be of the same depth and width. A conventional paradigm does not account for the possibility of variable bandwidths on the ingress and/or egress channels. In other words, all the ingress buffers of a conventional approach have a same data length per stored word (number of bits per word) and a same number of storage locations between ends (a same depth for each of the plural buffers) irrespective of channel or pipe bandwidth. Also, conventional egress processing assumes that all egress channels have roughly the same output rate and all egressing packet blocks or streams will exit the front-end FIFO's 131-133 at relatively same, smooth and continuous rates rather than as sporadic bursts each having a different egress rate depending on the egress pipe or egress channel to which the ingressing packets are directed (or on the egress pipe or egress channel to which post-processing packets are directed, where the post-processing packets are derived from the ingressing packets).

Recently, a number of communication protocols have started gaining favor wherein programmably or dynamically variable data rates are supported for plural channels. Included among these emerging protocols are the PCI-Express™ protocol and the HyperTransport™ protocol. These relatively new, industry standardized protocols allow different logical channels to each have a different, programmably-established or dynamically-defined channel configuration, including a different maximum data transmission rate. For example, one logically-configured communication channel may be programmably or dynamically formed as an aggregation of many, relatively slow sub-channel resources (i.e., PCI-Express "lanes") while another logically-configured channel may be variably formed to have one or just a few, such slow or basic sub-channel resources (i.e., lanes). The data bandwidth of the channel containing a greater number of basic sub-channel resources (such as egress pipe 162 which is shown to have 16 lanes—in other words, to have a "by 16" bandwidth configuration which is denoted as Ebw=×16) will generally be substantially larger than the data bandwidth of another channel having just one or few sub-channel resources aggregated together (e.g., egress pipe 161 which is shown to have a "by 1" configuration denoted as Ebw=×1). A trade off is typically made between the number of sub-channel resources allocated to each communication channel, the bandwidth of each such channel and the number of channels (virtual or hard) that device 100 supports. In the realm of PCI-Express™, the aggregated variable bandwidth channel resources are sometimes referred to as logical "ports" or "links" and the lowest common speed, sub-channel resource at the physical layer level is often referred to as a "lane". Lanes may be selectively aggregated together to define higher speed ports in PCI-Express systems. Ports may be selectively bifurcated to define larger numbers of virtual channels per port albeit with lower bandwidths per virtual channel. A packet routing device will generally have a finite number of lowest common speed, sub-channel resources (i.e., lanes) and configuration software may be used to determine how to allocate this finite number of resources to different ports so as to thereby optionally provide some device ports with more bandwidth than others.

More specifically, when a PCI-Express™ network is being adaptively configured or re-configured during network bring-up or reboot for example, the associated software determines how many lanes (subchannel resources) to assign to each PCI-Express™ "port" or PCIe logical "link" (—the terms PCIe port and PCIe link are sometimes used interchangeably although here "port" per se will refer to an input and/or output terminus of either a communications device or a memory unit—) so as to thereby define the maximum data rate supported by that PCI port. For example, a first PCIe port (e.g., port 173 of FIG. 1 which is shown to include a ×8 egress pipe 162) may be programmably configured to consist of an aggregation of 8 basic hardware lanes with a lowest common bandwidth per lane being 2.5 Gb/s (Giga-bits per second), thus giving the ×8 first Port an aggregated bandwidth of 20 Gb/s. That first port (173) can support a corresponding single channel of 20 Gb/s bandwidth or multiple virtual channels with lower bandwidths that can add up to as much as 20 Gb/s. At the same time, a second PCIe port (e.g., port 174 which has a ×2 egress pipe 164) can be programmably configured during network reconfiguration to consist of an aggregation of just 2 basic lanes, thus giving that ×2 second Port 174 an aggregated bandwidth of 5 Gb/s. A third PCIe port (e.g., port 171 which has ×1 egress pipe 161) can be programmably configured during the same network reconfiguration to consist of just one lane; thus giving that ×1 Port 171 a bandwidth of just 2.5 Gb/s. In a subsequent reconfiguration, the illustrated first through fourth ports 171-174 may be reconfigured differently due to flexible resource negotiations that can take place during each network reconfiguration session.

In a conventional PCI-e design that is directed to management of egressing packet traffic, it is often assumed that all egress channels are of roughly the same bandwidth and all egressing packets are egressing out on a roughly smooth, same rate basis through their respective egress channels. This can create inefficiencies and problems as will become clearer shortly.

Represented along row 110 (bottom left corner of FIG. 1) is a first plurality of logical transmission pipes 111-11N that are each associated with a respective aggregation of physical transmission media. Ingress pipes 111-11N respectively conduct signals from the respective data source devices (external link partner devices similar to 100, but not shown in FIG. 1) to an ingressing-data side (data receiving side) of the data buffering memory area 130 of device 100. In practice the aggregated physical transmission media and/or logical data transfer pipes 111-11N may appear united as a single coaxial cable or a single optical fiber or a high frequency transmission strip on a printed circuit board coupled to a physical media interface circuit followed by SERDES circuitry (serializing and de-serializing circuitry—not shown). Data transmission may be multiplexed spatially, temporally and/or by code division multiplexing over the unified media so as to implement plural transmission channels. In one embodiment, all the illustrated data pipes 111-11N, 161-164 can carry data that is multiplexed over a single, bidirectional optical transmission line prior to being demultiplexed and de-serialized into parallel electrical signal flows. In order to graphically illustrate certain aspects, however, the transmission media/pipes 111-11N and 161-164 (which can be bidirectional media/pipes that are pairwise merged together) are schematically shown as being separate wide, narrow or medium width data pipes. Width on the egress side of FIG. 1 (the right side) indicates bandwidth in this schematic representation. Transmission pipe 162 for example is shown to be a relatively "fat" data flow pipe which means that pipe 162 has been configured to handle a large output bandwidth from device 100. In contrast, transmission pipe 161 is shown as a comparatively thinner data flow pipe which means that pipe 161 handles no more than the smaller ×1 output bandwidth for data egressing out of device 100. Similarly, transmission pipe 163 is shown as a medium width data flow pipe that is configured to handle a relatively medium, ×8 output bandwidth for data egressing out of device 100. The fourth egress pipe 164 is shown as another relatively thin data flow pipe (a ×2 lanes configuration). Ingress pipes 111-11N may be similarly configured in a variable manner to have respective narrow or wide ingress bandwidths, $IBW_1$-$IBW_N$ although this is not shown by pipe width. In one embodiment there is a physical match in terms of lanes assigned to a given ingress pipe (i.e., 111) and to its counterpart egress pipe (i.e., 161). The bandwidths of virtual ingress and egress channels may still differ however. Bus 118 provides coupling between the ingress pipes 111-11N and real or virtual write ports 121-123 of respective ingress FIFO's such as 131-133.

Shown at 115, next to the ingress pipes 110, is an exemplary data packet having a header section 115*a*, a payload section 115*b* and an error checking and/or correcting section (i.e., CRC or ECC) 115*c*. Typically the header section 115*a* contains length information indicating the length of the packet data to follow behind up to and possibly including the tail end error checking and/or correcting section 115*c*. Typically such an error checking and/or correcting section 115*c* is located at or very near the tail end of the packet body 115 so that an on-the-fly generated error syndrome can be compared with the last arriving CRC or ECC code 115*c*. It is to be understood that each of pipes 111-11N and 161-164 carries digital data packets similar to 115 except that the specific structures, lengths and/or other attributes of packets in each pipe may vary from application to application. (For example, some packets may not include a CRC or ECC section like 115*c*. Moreover, some packets may be used for providing messaging only between the data link layers (DL) or transaction layers (TL) of link partner devices and may not simultaneously carry payload data for the file data layers.) Under some communication protocols, a source device (not shown, but understood to be a link partner with device 100 and connected to 100 via pipes 111 and 161 for example) first requests access to a network pathway that can couple the source device to the corresponding ingress pipe (e.g., 111) of device 100. A system domain controller (not shown) grants that request, and the source device then streams a continuous sequence of packets (for example, packets 131*a*, 131*b* carrying respective payloads of source data) through the granted network pathway. When finished, the source device (not shown) will typically relinquish its use of the pathway so that other source devices (or reply-completion devices) can request and obtain use of the relinquished network resources for their transmissions. As such, it is advantageous to have a packet processing device (i.e., 100) that finishes its part of a packet routing and/or other packet processing operation as quickly as possible so that network resources can be quickly relinquished for time-shared use by other routing and/or processing jobs. However, it will be shortly seen that the architecture of device 100 can disadvantageously create a road-block to such quick processing. Device 100 has a replay buffer structure defined by replay buffer structures 151-154 (wherein incidentally, memory cells of the rate matching FIFO's 151*a*-154 do not provide any storage for replay data) whose limited pass-through rates—through copying structures 151*h*-154*h*—can lead to the undesirable head-of-line blocking problem. The replay buffer structures can also give rise to a phenomenon known as late notification of error as will also be explained.

Figure 2:
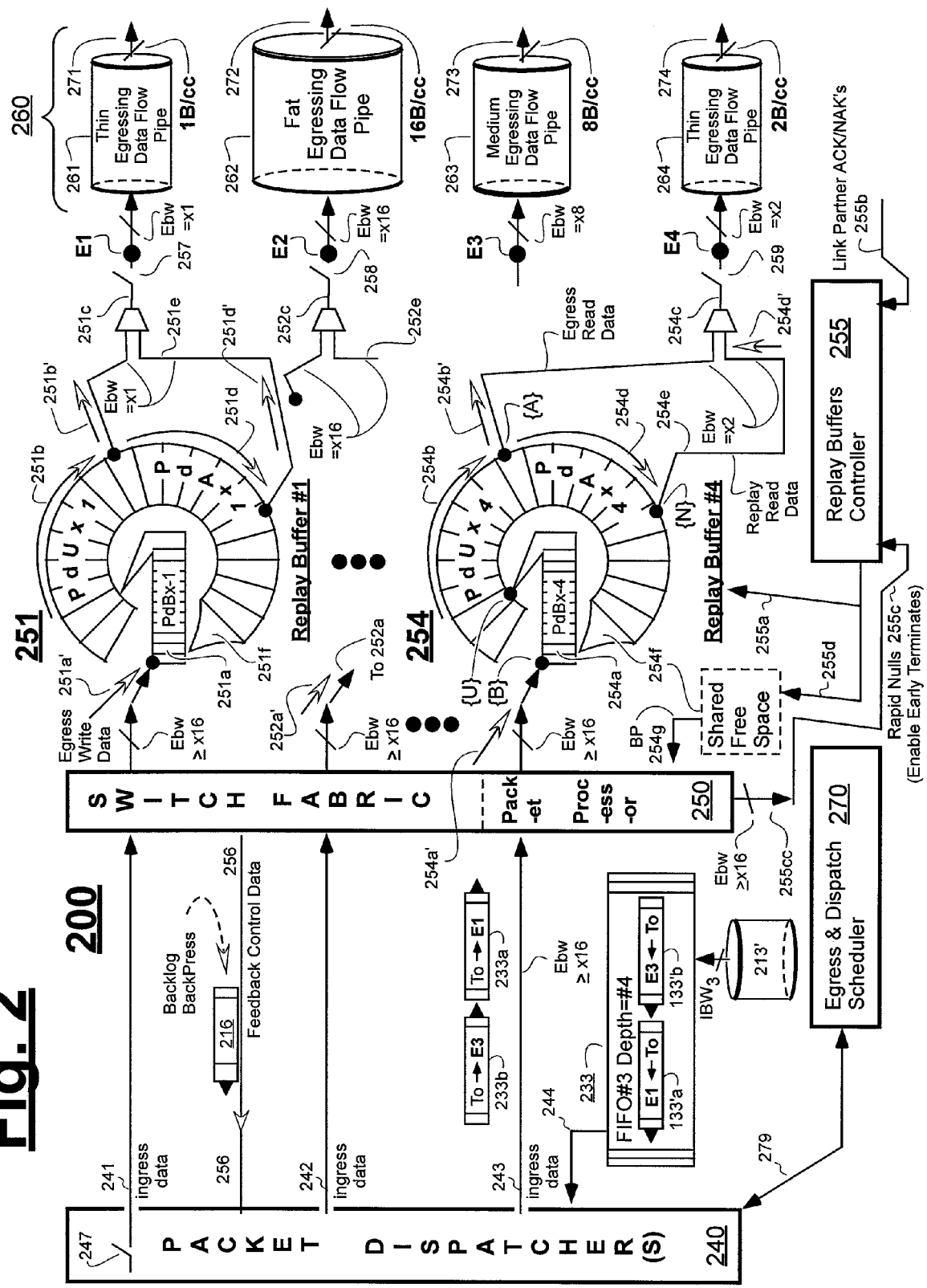
FIG. 2 is a block diagram of a packet switching system in accordance with the disclosure that includes an integrated egress/replay memory structure for storing currently egressing packet data (PdUx), replay packet data (PdAx) and to-be egressed packet data (PdBx) and for maintaining a flexible free space area between the storage areas of the PdAx and PdBx.

Data packets (e.g., 131*a*, 131*b*, ..., 133*b*) that are received from the respective ingress pipes 111-11 N appear at a data-input side of memory region 130 as respective write data flows 121-123 for example. An ingress routing means (not shown, but understood to couple to a write address port of unit 130) may be provided for directing the respective data flows 121-123 to corresponding FIFO buffers 131-133 within memory region 130. In accordance with conventional FIFO configuration schemes, each of FIFOs 131-133 has a same data width (bits per storage location) and a same depth (total storage capacity). In accordance with the above cited and co-pending patent application (U.S. Ser. No. 11/390,754 whose disclosure is incorporated here by reference), each of FIFOs 131-133 is a virtual FIFO with a variable memory capacity (e.g., elastic depth) that adaptively conforms at least to the bandwidth of a specific ingress pipe 111-11 N serviced by that FIFO. The depth numbers (#1, #2, #3) given for FIFO's 131-133 in FIG. 1 represent corresponding numerical values which can be the same or different from one another. The optional elasticity of FIFOs 131-133 (and thus optional variation of values #1, #2, #3) per U.S. Ser. No. 11/390,754 will generally not affect the egress operations described herein. However, the converse is not true. The egress operations described herein with regard to FIG. 2 may advantageously reduce the amount of ingress depth (if any) that is needed for a given ingress FIFO (e.g., the Depth=#4 memory space used by FIFO 233 of FIG. 2 as compared to the Depth=#3 memory space needed by FIFO 133 of FIG. 1) and therefore this interplay between ingress FIFO depth and use of the integrated memories approach of FIG. 2 is mentioned here as a beneficial aside that can arise from use of the integrated egress/replay memory structure described herein. Also, a so-called cut-through operation of the ingress side FIFOs 131-133 may give rise to a late error notification defect as shall be detailed below. Thus operations of the ingress and egress sides of device 100 can affect one another and it is worthwhile to understand both sides.

In the illustrated example of FIG. 1, it is assumed that the respective depth values, #1-#3 of respective ingress FIFO's 131-133 have been fixedly designed or adaptively reconfigured to be roughly "just right" (neither too much nor too little) for matching the expected data input rates seen on their respective ingressing data flow pipes 111-11 N. However, this alone does not prevent a head-of-line blocking problem that can develop in each of the ingress FIFO's 131-133.

More specifically and for purpose of example, it is assumed that packet 131a contains header information routing it to egress point E1 (associated with narrow egress pipe 161) and that the next-in-queue packet 131b of FIFO 131 contains header information routing it to egress point E2 (associated with the much wider egress pipe 162). Assume further, although it is not shown, that first packet 131a has a relatively long payload section (like 115b) with its ECC or CRC code (115c) very far back in FIFO 131 or not yet even ingressed into FIFO 131 while the second packet 131b (when it finally gets into FIFO 131 behind the tail end 115c of packet 131a) has a substantially shorter payload section. However, because the first packet 131a (the one destined for slower egress point E1) is ahead in the queue (in FIFO 131) of the next-in-line packet 131b where the latter is destined for the faster egress point E2, the substantially shorter payload data of the second packet 131b will have to wait until the entirety of the longer payload of first packet 131a trickles slowly out of FIFO 131 at the tortoise-like rate dictated by narrow egress pipe 161 before the payload data of the second packet 131b can zoom out at the substantially faster, rabbit-like egress rate allowed by the configuration of wide egress pipe 162. This is an example of head-of-line blocking. The packet 131a which is shifting out for egress from the relatively low bandwidth port 171 (Ebw=×1) blocks the next-in-line one or more packets (i.e., 131b which is to shift out to the relatively higher bandwidth port 172 having an Ebw=×16) and thus all the back of line packets in FIFO 131 have to suffer a prolonged waiting period just because the front-of-line packet 131a has been directed toward egress from a relatively low bandwidth port (i.e., 171 whose egress bandwidth in one embodiment is 1 byte per clock cycle or 1 B/cc).

FIG. 1 is strange in that often the packet data dispatcher 140 is positioned between the ingress memory 130 and the switch fabric 150. Unit 140 was drawn outside of its usual position to better illustrate a point. Dispatcher 140 is controlled (via line 179) by an egress dispatch scheduler 170 where the latter scheduler determines when and at what rate data will be dispatched from the output side (data reading side) of ingress memory 130 for subsequent routing through switch fabric 150 and delivery to a respective one of replay buffer structures (retry buffer structures) 151-154. Dispatcher 140 is shown connecting to the read address input of memory unit 130 by way of line 139 for determining which data will be dispatched and also by way of line 138 for providing read enable and/or other controls to memory unit 130. The average rate of dispatch conventionally matches the average rate of egress. Back pressure signals 151f-154f output by the rate matching FIFO's 151a-154a and supplied to the dispatcher 170 as signals 151f-4f help to guarantee that the dispatcher 170 will not outpace the bandwidths of the respective egress ports 171-174. FIG. 1 shows the packet dispatcher 140 as if it were positioned between the switch fabric 150 and the rate matching FIFO's 151a-154a (although this is not usually the case) so that the conventionally required match of average throughput bandwidths between dispatch switch 147 and replay read switches 157-159, etc., can be better seen. Both data sampling switches, 147 and 157, are operated at the same average egress bandwidth (i.e., =×1 in the illustrated case). Post-routing egress data that passes through sampling switch 147 enters the short, rate-matching FIFO 151a of replay buffer structure 151 at the ×1 bandwidth rate and exits as a Packet-Data-Under-Transmission signal (PdUx 151b) by way of a data-routing multiplexer output path 151c for coupling to egress point E1 at the same ×1 bandwidth rate. To emphasize the point, the second sampling switch is shown at 157 and understood to be operating at the same Ebw=×1 average bandwidth. During transmission, the same read-out data (e.g., 141) is copied at the Ebw=×1 average bandwidth rate into a replay buffering memory denoted as 151d. Packet data that is temporarily stored in this replay buffering memory is referred to herein as Packet-Data-After-Transmission (PdAx) and it too is identified by reference numeral 151d. If the egress-side link-partner (not shown) of port 171 sends back a negative acknowledgement (NAK) to device 100, after the initial packet data signal (PdUx 151b) went out, the temporarily stored PdAx back up data 151d is copied out (not erased just yet) from the replay buffering memory 151d and transmitted via path 151e and via multiplexer 151c (which mux has an output line designated by the same 151c reference number) for coupling to the egress point E1 and repeated output at the ×1 bandwidth rate through pipe 161 and port 171 to the link-partner that sent the NAK signal. In this way, if noise or some other anomaly momentarily infected the network link that connects port 171 to the link-partner (not shown), the copy 151d of the earlier played data 151b (the first-played PdUx signal 151b) can be easily replayed out of the egress pipe without consuming switch fabric bandwidth.

Although operation of replay buffer structure 151 has been described in terms of the data itself moving into and through the replay buffering memory 151 d, artisans skilled in the art will appreciate that more typically the same effect may be accomplished by advancing read and write pointers at same rates around a circular buffer while the data stays put in its original storage location in memory 151d until overwritten by new data. The replay buffers controller unit 155 is operatively coupled by way of control line 155a to the replay buffer structures 151-154 for managing the read and write pointers of playback memory 151d as well as the data read and write operations and the selective data routing through multiplexer 151c. The replay buffers controller unit 155 will additionally receive the back-pressure signals 151g-4g from the replay memory buffers 151d-154d. If egressed data has not been ACK'ed by the link partner of port 171 and buffer 151d for example fills to beyond its predefined safe capacity, the controller unit 155 will receive the back-pressure flags 151g and instruct the replay buffer 151d to not accept the writing of new data (151b) into it until the data backup problem is resolved. As is known by those skilled in the art, in place of back-pressure flags, signals 151f may instead constitute slack space advisements (free space credit values) indicating how much free space is available in corresponding replay buffer 151d. Such slack space advisements are typically used in PCI-Express systems.

A similar arrangement is shown for the case of the second replay buffer structure 152. The Packet-Data-Under-Transmission signal (PdUx2, also denoted as 152b) enters the rate-matching FIFO 152a at the same rate (Ebw=×16) that data exits from the data-routing multiplexer output path 152c for coupling via sampling switch 158 to egress point E2. During the first time read-out, a copy of the same data signal, PdUx2 is stored into the replay buffering memory denoted as 152d and thus becomes denoted as the saved Packet-Data- After-Transmission (PdAx2) that remains stored in the replay storage area 152d at least until a positive acknowledgement of receipt (ACK) is received from the link-partner (not shown) that couples to device port 172. If on the other hand, that link-partner sends back a negative acknowledgement (NAK) to device 100, then a copy of the still stored PdAx2 data (152d) is routed via path 152e and via mux 152c at the Ebw=×16 rate to egress point E2 for a second time output through pipe 162 and through port 172 to the link-partner that sent the NAK signal. In this way, if noise or some other anomaly momentarily infects the network link that connects port 172 to the link-partner (not shown), a copy of the earlier egressed packet signal PdUx2 (152b) can be easily replayed out of the egress pipe without consuming switch fabric bandwidth. Line 155b of controller 155 carries the ACK and NAK signals from the respective link partners to the replay buffers controller unit 155. In one embodiment, if a given link partner fails to send an ACK within a predetermined time-out period, the replay buffers controller unit 155 treats that situation as if a NAK had been received and proceeds to replay a copy of the saved PdAx data out to the link partner that failed to provide a timely ACK signal.

Operations for the third and fourth replay buffer structures 153-154 are substantially similar except that structure 153 operates at the Ebw=×8 bandwidth rate and structure 154 operates at the Ebw=×2 bandwidth rate as is indicated in FIG. 1.

For purpose of completeness, two other attributes should be mentioned; nullifications (155c) and return packets 116 returned by link partners. Return packets 116 may contain slack advisement signals instead of back-pressure flags for signaling how much storage slack is left in the ingress side of the slack advising device (e.g., 100). With regard to late nullification, consider the case where an unusually long ingressing packet (i.e., 132a) enters the ingress data buffering memory 130. It is typically necessary for the whole of that extra-long packet, including its tail end (132err/115c) to have entered through its respective ingress pipe (i.e., 112, not shown) before error checking can be performed at the ingress side of device 100 and it can be determined if the packet (132a) contains an uncorrectable error. If yes, a true nullification flag is generated for that error infected packet at the time the tail end (132err) ingresses into its respective ingress FIFO (i.e., 132). The then-generated nullification flag travels with the tail end data of the packet through the switch fabric 150 and into the replay buffer structure (i.e., 154) associated with egress of that error-infected packet (132a) through its corresponding destination pipe (i.e., 164 where Ebw=×2). By the time the nullification flag is generated however, and passed through the switch fabric 150 to the egress side of the device 100, much of the error-infected packet data may have already been transmitted out through the relatively slow egress pipe (i.e., 164), particularly if an early cut-through operation is in progress. (Early cut-through is routinely used to transmit not-yet checked packet data when unusually long packets i.e., 132a, are moving through and the egress side link partner has free space for absorbing the not-yet checked packet data.) This transmission of error infected packet data will ultimately be seen; when the late arriving nullification flag finally arrives at line 155c of controller 155, to have been a waste of energy and time because the transmitted data is garbage. In a conventional device, when a true nullification flag finally arrives at the egress side controller 155 it causes the PdAx copy of the same packet to be dropped or purged from the replay buffer (154d) because it is finally known that this PdAx portion (154d) is garbage. However, during the time before the asserted nullification flag finally arrives at the egress side controller 155, the garbage data (i.e., 154d) sits in storage space of its respective replay buffer structure (i.e., 154) and thereby consumes storage area that might have been put to better use over that prolonged duration. In the conventional design, it is too late and/or too cumbersome to try and terminate transmission of the errant tail end data portion PdUx4 then passing through the rate-matching FIFO 154a and heading 154b towards the link partner. It is easier to just let that error-infected tail end (132err) simply flow through. As such, even after it is known the data has failed the error check (CRC or ECC), the limited bandwidth of slow egress pipe 164 is nonetheless further wasted for transmitting more garbage data, typically to the time that the bitter tail end (132err) of the error-infected packet 132a flows through. The limited bandwidth of egress pipe 164 is thus not used for a potentially better purpose of transmitting the potentially valid next packet, 132b, until all of the first-in-line but defective packet 132a has been fully transmitted out to the link partner on the other end of egress pipe 164.

Consider next the case of wide pipe 162. Assume that the destination link partner device (not shown) has many such wide pipes feeding into it and only a few narrow pipes feeding out. The destination device may become overwhelmed if data ingresses into it faster than the data can egress out of that link partner. Before that happens, the about-to-be overwhelmed link partner typically starts sending true backpressure flags (or slack tokens with low or zero credit amounts) to device 100 in feedback packets like 116 and via feedback path 156. The backpressure flags or credit tokens flow to scheduler 170 for example via connection 138. In response, the scheduler 170 reduces the number of dispatches it grants per unit time to packets (i.e., 131b) heading towards the about-to-be overwhelmed link partner. Similarly, if the scheduler 170 detects via connection 138 that one of FIFO's 131-133 is about-to-be overwhelmed by too much incoming data, scheduler 170 will cause true backpressure flags (or low credit slack advisements) 156a to be inserted into feedback packets (116) heading back to the respective ingress-side link partner that is feeding data towards the about-to-be overwhelmed ingress FIFO (i.e., 132). One or both of buffer slack advisements and backpressure flags may be used to dynamically control traffic flow densities heading towards various buffers. In PCI-Express systems, a so-called flow-control credit exchange process is used to dynamically manage data flow rates between link partners.

One way to reduce the frequency at which true backpressure flags (and/or credit-reducing slack advisements) 156a are sent from device 100 to its ingress side link partner is to provide deeper ingress FIFO's within memory region 130. However this consumes scarce memory space. An alternate way is too output data from the read ports 141-143 of the FIFO's 131-133 at a faster rate so that data does not accumulate excessively and/or too often in the ingress FIFO's 131-133. It will now be shown how the latter operation of speeding up data output from the ingress FIFO's 131-133 can be accomplished even if the corresponding egress pipe (i.e., 161 or 164) to which packet data is being directed is a relatively narrow and thus slow one.

Referring to FIG. 2, shown is a packet switching device 200 in accordance with the present disclosure. Where practical, like reference symbols and numbers in the "200" century series are used for elements of FIG. 2 which correspond to but are not necessarily the same as the elements represented by similar symbols and reference numbers of the "100" century series in FIG. 1. As such, an introductory description of many elements already described in FIG. 1 is omitted here. Device 200 is understood to include a plurality of ingress data pipes like 110, and optionally with each having a variable ingress rate, although the plurality of ingress data pipes is not fully shown in FIG. 2 Just ingress pipe 213' having variable ingress bandwidth $IBW_3$ is shown. Device 200 is understood to optionally also include an ingress data buffering memory like 130 although not fully shown in FIG. 2; where the ingress data buffering memory has its data read lines (i.e., 244) coupling into a packet dispatching unit like 240. Dispatcher output lines 242-243 of the dispatcher 240 couple to the switch fabric module(s) 250. In one embodiment, although not shown, there is second dispatcher on the right side of switch fabric 250 for managing the flow of backflowing packets that carry back-pressure or slack credit tokens from the egress-side of device 100 to the ingress side of that device. Continuing with the description of packet flow from the ingress side to the egress side, it is seen that post-routing output lines of the switch fabric 250 couple to integrated egress/replay memory structures 251-254 (Only two of these four structures are shown more fully. The integrated egress/replay memory structures 251-254 are at times also referred to herein as integrated play/replay memory structures where the play portion of the name refers to a first time play out (i.e., 251$b'$) of data that had been injected at relatively high speed (i.e., 251$a'$) into the integrated memory structure (i.e., 251).)

Unlike the replay buffer arrangement (i.e., 151$a$/151$d$) of FIG. 1 where data passes at an egress-matching rate through a rate-matching FIFO (151$a$) and is copied (151$h$) in the process into a replay buffer memory (151$d$), in FIG. 2; integrated circular buffer structures (i.e., 251) are used for receiving processed packet data (e.g., routed packet data) 251$a'$ at a first, relatively high bandwidth rate (e.g., $Ebw \geq \times 16$) and for metering out egress data (251$b'$) at a potentially much lower bandwidth rate (e.g., $Ebw = \times 1$ for the $\times 1$ port 271). Respective data-router output lines 251$c$-254$c$ of the integrated egress/replay memory structures couple to their respective egress pipes 261-264. (Note: Although data routers 251$c$-254$c$ are schematically shown as simple multiplexers, in one class of embodiments they define more complex arbiters. See FIGS. 3A-3B.) The average data egress bandwidths at the entrances (E1-E4) of the egress pipes 261-264 still match the average egress bandwidths of the corresponding ports 271-274. However, such matching of bandwidths is not required in this structure 200 for the packet data 241-243 leaving the ingress side FIFO's (i.e., 233) and routing through the switch fabric 250 for rapid injection into so-called, entry raceway sections 251$a$-254$a$ of the integrated egress/replay memory structures 251-254. Packet data (251$a'$) that is absorbed at a first relatively high speed into the respective entry raceway sections 251$a$-254$a$ is later metered out at the egress bandwidth matching rates to first-play lines 251$b'$-254$b'$ and into replay storage areas 251$d$-254$d$ of the integrated egress/replay memory structures 251-254. In one embodiment, the respective entry raceway sections 251$a$-254$a$ can receive data (i.e., 251$a'$) at a first relatively high speed corresponding at least to the highest bandwidth allowed among egress ports 271-274 (e.g., $Ebw_{max} = \times 16$ in this example). In a second embodiment, the respective entry raceway sections 251$a$-254$a$ can receive data at a first relatively high speed corresponding at least to the highest instantaneous bandwidth at which such packet data can be transmitted through the packet data processing unit (i.e., switch fabric unit) 250. The highest instantaneous bandwidth of the packet data processing unit 250 is often greater than (e.g., $>\times 16$ in this example) the highest bandwidth allowed among all the egress ports 271-274 of the device 200 because the packet data processing unit 250 may need some additional time slots for managing its processing of the packet data beyond the time slots consumed for routing the packet data to the targeted one or more egress pipes 261-264. Accordingly, the respective entry raceway sections 251$a$-254$a$ are structured to receive the processed packet data at a rate which at least matches the highest instantaneous bandwidth of the packet data processing unit 250 if not exceeding it. It is within the contemplation of the disclosure that packet data processing unit 250 may provide additional or alternate packet data processing functions aside from selectively routing the ingress side blocks of data to the integrated egress/replay memory structures 251-254 on the egress side. The additional or alternate packet data processing functions may include altering control and/or payload data within the passing through packets or inserting additional data where for example, the on-the-fly alterations are carried out for purpose of conforming with a communication protocol present on the egress side but not on the ingress side of device 200.

Although the integrated egress/replay memory structures 251-254 are not drawn as simple circular buffers, at the end of the day structures 251-254 can be implemented as circular buffers, albeit with the ability to read and write data at different rates. One aspect lies in how data is organized inside the integrated egress/replay memory structures 251-254 and how the bandwidth rates at which data is written into (rapidly injected into), and read out of structures 251-254 can differ. More specifically, in one embodiment, each of integrated egress/replay memory structures 251-254 stores three types of data: (1) egressing packet data that is currently being transmitted—also referred to herein as PdUx; for example such as the Packet-Data-Under-Transmission data shown circulating at 251$b$ and being copied out of memory as PdUx signal 251$b'$; (2) replay packet data—also referred to herein as PdAx; for example such as the Packet-Data-After-Transmission shown circulating at 251$d$ and optionally being output along playback line 251$e$; and (3) to-be egressed packet data—also referred to herein as PdBx; for example such as the Packet-Data-Before-Transmission data 251$a'$ shown to have been rapidly injected (at for example an $Ebw \geq \times 16$ rate) into raceway memory region 251$a$.

Additionally, a shared free space for example such as shown at 251$f$ is managed between the storage areas of the circulating PdAx data 251$d$ and of the rapidly-injected PdBx data 251$a$. The to-be egressed data (PdBx-1) is allowed to enter into (to be written into, or injected into) the front-end raceway portion 251$a$ of integrated memory structure 251 at a rate (e.g., $Ebw \geq \times 16$) which can be substantially greater than that (e.g., $Ebw = \times 1$) allowed for the corresponding egressing packet data signal 215$b'$ (PdUx1). Although the techniques of pointer rotation and read-out via the rotating pointer are more typically used in embodiments of the present disclosure, the PdUx1 data can be thought of as if it were circulating (251$b$) inside its section of integrated egress/replay memory structures 251 at a rate matching the bandwidth of the data stepping out through corresponding egress pipe 261. The -circulating PdUx1 data 251$b$ becomes PdAx data 251$d$ after the corresponding PdUx1 data signal 215$b'$ has egressed out of the respective port 271. Given that the to-be egressed data (PdBx-1) is injected into the front-end raceway portion 251$a$ at full speed (e.g., at the $Ebw \geq \times 16$ bandwidth rate), the slowness of the destination port (271) no longer limits the speed at which the to-be egressed packet data (PdBx-1 251$a$) can be shifted out of a corresponding ingress queue (e.g., 233), through the packet processor/switch fabric 250 and into the front-end raceway portion (e.g., 251$a$) of the corresponding integrated egress/replay memory structure 251. Thus, even when egressing packet data (e.g., 133'$a$ of FIFO 233) is positioned at the head of a queue for shifting out toward a slow rate egress port (e.g., 271), head of queue blocking no longer occurs.

As mentioned, a shared free space memory area 251$f$ is maintained between the storage areas of the replay packet data (PdAx, i.e. 251$d$) and to-be-egressed packet data (PdBx i.e. 251$a$). When a positive acknowledgement (ACK) is received from the destination of the already-egressed data (of the After-Transmission Data, or PdAx), the corresponding replay storage area (the area storing the acknowledged PdAx data 251$d$) can be allocated as free (where data erasure is optional but not necessary for freeing the space) and thus the space can be reallocated for use as an empty part of the raceway portion 251$a$, thereby increasing the length of the raceway portion 251$a$ and allowing more to-be-egressed data (PdBx=Packet-Data Before Transmission) to enter into the raceway portion 251$a$ at relatively high speed.

Also, if to-be-egressed-but-subsequently-nullified packet data (null-PdBx) enters into the raceway portion 251$a$ at high speed (i.e., at an Ebw$\geq$×16 rate), the corresponding raceway storage area 251$a$ can be cleared (optional) of this nullified PdBx data and reallocated for use as an empty part of the raceway portion, thereby increasing the empty length of the raceway portion 251$a$ and allowing yet more to-be egressed data 251$a'$ (which subsequent PdBx is typically not nullified) to enter into the raceway portion 251$a$ at relatively high speed. If the nullification flag for an error infected packet (i.e., 132$a$) arrives at the egress side while the entirety of the packet is still within the PdBx raceway area (i.e., 251$a$) then that entire packet can be automatically purged form the raceway (i.e., from 251$a$) to thereby transparently remove the error infected packet (i.e., 132$a$) before any of it manages to circulate into the PdUx section 251$b$ and/or out of the packet data play out line 251$c$. An important but subtle consequence of being able to receive the end of an erroneous packet more quickly (earlier in time than what is necessary for egressing the end-of-packet data out of its slow egress pipe i.e., 261) is that ECC nullification flags generated by the ingress side circuitry are able to more quickly traverse through the packet processor and/or switch fabric 250 and to get to the null-receiving lines of the replay buffer controller 255. The replay buffer controller 255 can then responsively invoke a raceway purge of the packet data if all of the packet data still sits in the raceway 215$a$. This subtle aspect particularly relates to the so-called cut-through operation mentioned above and this will be detailed even further momentarily. To recap what has been described, the high speed write-in option that is made possible by the high speed raceways 251$a$-254$a$ of the integrated egress/replay memory structures 251-254 helps to alleviate the head-of-line blocking problem that may otherwise arise in ingress-side FIFO's (e.g., 233) due to slow egress rates at the targeted egress pipe (i.e., 261) and it helps to reduce the wait time for the corresponding nullification flag to arrive on the egress side of the circuitry in cases where the respectively ingressing packet (i.e., 132$a$) is found to be error infected when the tail end of that packet finally passes into error checking circuitry at the ingress side of the device 200. Note that the depth of FIFO 233 (Depth=depth value #4) is denoted as being different than that of corresponding FIFO 133 in FIG. 1 (Depth=depth value #3). In some embodiments the depth of FIFO 233 (Depth=#4) can be made smaller than the depth of FIFO 133 (Depth=#3) because packet data generally dispatches out of FIFO 233 (Depth=#4) and through the switch fabric at the maximum allowed bandwidth of the fast raceways (i.e., 251$a$-254$a$) of the integrated egress/replay memory structures 251-254. By contrast in FIG. 1, packet data may dispatch out of FIFO 133 (Depth=#3) and through the switch fabric at potentially the minimum egress bandwidth (e.g., Ebw=×1) depending on how narrow the targeted egress pipe is for that packet. Thus FIFO 133 will often have a depth (Depth=#3) long enough to accommodate the worst case scenario wherein all its egress data is being targeted toward the slowest of the egress pipes.

Referring still to FIG. 2 and in terms of more specifics, assume that an ingressing first packet 133'$a$ shows up on the queue line of FIFO 233 as heading towards (being targeted to) the relatively low bandwidth egress point E1 and an ingressing second packet 133'$b$ shows up next on the queue line of FIFO 233 behind 133'$a$ and as heading towards the relatively higher bandwidth egress point E3. In such a case, the first-in-queue packet 133'$a$ will not unduly increase the duration of in-queue waiting for the next-in-line second packet 133'$b$ because the first-in-queue packet 133'$a$ will zoom out through the dispatcher 240 and switch fabric and/or data processor 250 at the maximum bandwidth (e.g., Ebw$\geq$×16 in the illustrated embodiment) that is allowed on the egress receiving raceways 251$a$-254$a$, provided there is enough free space 251$f$-254$f$ allocatable to the receiving raceway (251$a$-254$a$) to accommodate the first-in-queue packet (e.g., 133'$a$) in the corresponding destination buffer 251-254. In one embodiment, the amount of allocatable free space 251$f$-254$f$ is signaled back to the dispatch scheduler 270 by way of back-pressure flags or credit tokens 254$g$.

An important aspect to note when studying the egress buffer raceways (251$a$-254$a$) is that, under normal conditions, control line 255$b$ of the replay buffers controller frequently receives ACK's that are quickly returned from the link partners of device 200 and very infrequently receives a NAK or detects a timed-out failure due to a link partner's failure to return an ACK. Thus under normal conditions where the links of respective egress ports 271-274 are healthy, additional storage area is frequently returned very quickly to the free space areas 251$f$-254$f$ as a result of corresponding ones of once-played-out packets (PdUx) having successfully made it through the network and as a result of receipt of corresponding confirmations coming back quickly from the corresponding link partners. Accordingly, the storage area (251$d$-254$d$) occupied by replayable data of the once-played out, and now acknowledged (ACK'ed) packet is quickly reallocated for use by free space area 251$f$-254$f$. And this repeatedly replenished free space area 251$f$-254$f$ can then be used as raceway injection area 251$a$-254$a$ for each accommodating a next routed block of packet data that enters the replay buffer structure 251-254 at the predetermined maximum bandwidth rate (i.e., Ebw$\geq$×16). Thus the free space areas 251$f$-254$f$ are routinely made empty and made sufficiently long to easily accommodate receipt of a next routed block of packet data (e.g., 233$b$) as soon as that latter block of packet data is given an egress time slot by the scheduler 270.

An optimization feature that is commonly found in conventional systems (e.g., 100 of FIG. 1) is known as early cut-through. Referring to FIG. 1, assume that the data ingress bandwidth on line 121 is equal to or larger (e.g., IBW$_1 \geq$ EBW$_{E1}$) than the egress bandwidth of the pipe the current first-in-line packet (e.g., 131$a$) is heading to. Assume also that current first-in-line packet (e.g., 131$a$) is very long and its entirety has not yet finished shifting into ingress pipe 131. Thus it is not yet known whether error checking of the packet 131$a$ will produce a valid data flag or an error flag. Assume further that the link partner (not shown) at the other end of egress pipe 171 is close to empty or signals (with use of credit tokens) that it has enough slack room to receive more ingress data (i.e. a cutting through packet). In order avoid having the link partner (not shown) run dry and the possibility of the link of port 271 having nothing to do, it is conventional in such cases (where $IBW_1 \geq EBW_{E1}$ and the link partner having accommodation room) to allow the head-end portion of incomplete and unchecked packet 131a to "cut-through" the switch fabric and thereby fill the ingress buffer (not shown) of the link partner while also making more room available in the ingress buffer 131 of device 100 for the data ingressing into that FIFO at bandwidth $IBW_1$). This same early cut-through operation is used in device 200 of FIG. 2. The problem with early cut-through when used in the conventional device 100 (FIG. 1) is that sometimes the ingress side error checking circuitry (not shown) of device 100 produces a true error flag (also sometimes presented as an invalid data flag). In that case, the early cutting-through but error-infected packet data is already streaming out of the egress pipe 161 and being buffered into the ingress buffer of the link partner at the other end of pipe 161. As a consequence, a result exactly opposite to what was intended is achieved. Instead of being gainfully used, the limited bandwidth of slow pipe 161 is being wasted on the transmitting of garbage data. Moreover, bandwidth in the link partner is being wasted in receiving garbage data.

By contrast, in the device 200 of FIG. 2, if data from an early cutting-through packet is sitting in the raceway (e.g., 251a) when the true error flag (also sometimes presented as a nullification flag) comes through at high speed (e.g., via coupling 255cc i.e., having a bandwidth of $Ebw \geq \times 16$ and into null receiving line 255c of the controller), the buffer controller 255 can early terminate transmission of the erroneous packet data by purging the erroneous packet data still residing in the raceway (e.g., 251a), thereby making free space room available for the data of a next packet (i.e., 132b) to enter the raceway (215a) and start egressing out of the corresponding pipe (i.e., 261) where the likelihood is that this next-in-line packet 132b will be found to be valid. The length of raceway data belonging to the error infected and cutting-through packet is known because the packet header provides length information for its body. As a result of such removal of infected data from the raceway (251a), less bandwidth is wasted on the transmitting of known garbage data through a low bandwidth egress pipe (261) as may otherwise occur with an early cut-through operation. The receiving link partner (not shown) is thus saved from spending excessive time receiving and processing more of the garbage data than has already been received.

Figure 3A:
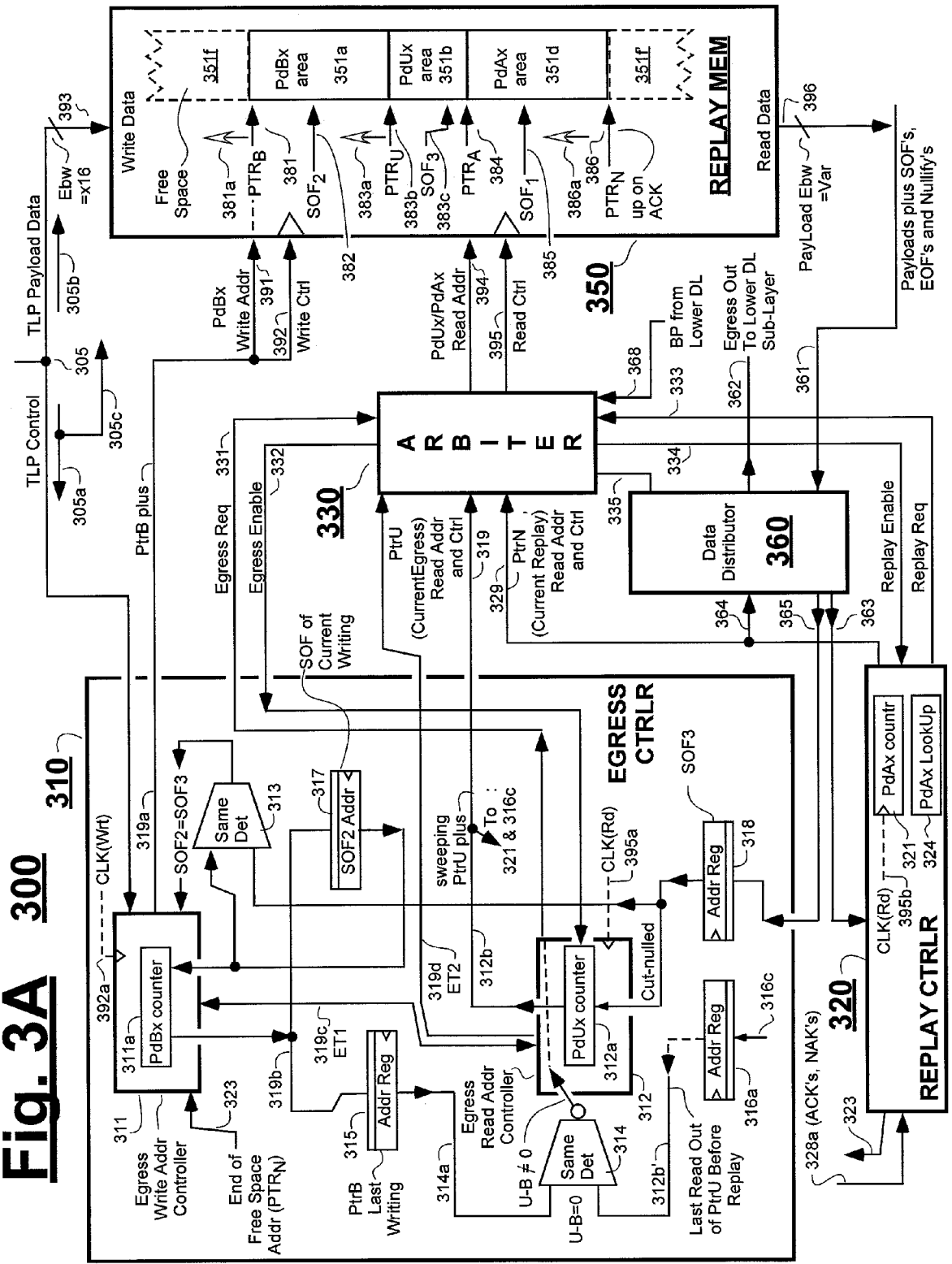
FIG. 3A is a schematic diagram showing details of an integrated egress/replay memory structure that may be used in a PCI-Express network in accordance with the disclosure.
Figure 3B:
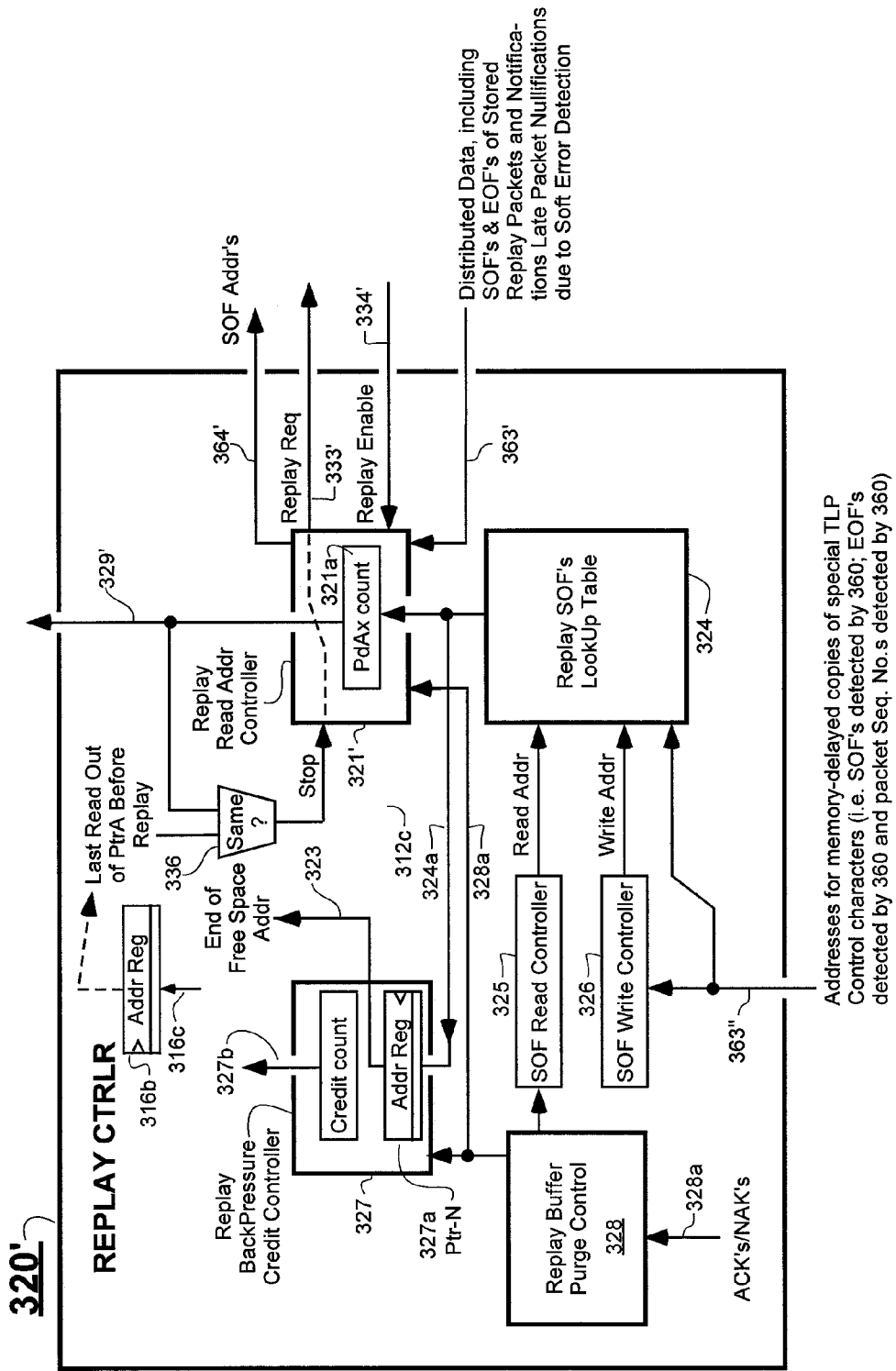
FIG. 3B is a schematic diagram showing further details of support circuitry for the integrated egress/replay memory structure of FIG. 3A.

Although operation of integrated egress/replay buffer structure 251-254 has been described in terms of the data itself racing or injecting quickly into the straight raceway (i.e., 251a) and thereafter possibly circulating more slowly around the circular path portions (i.e., 251b,251d; an exception being where the egress pipe bandwidth equals the maximum raceway bandwidth), artisans skilled in the art will appreciate that more typically the same effect can be accomplished by advancing read and write pointers at appropriate rates while the actual data stays put in its original storage location until overwritten by new data. In this regard, reference is now made to FIGS. 3A-3B where a particular embodiment 300 that uses a variety of pointers, counters and counter-reloading registers will be detailed. For purpose of making the logical connection between FIG. 2 and FIGS. 3A-3B easier to spot, four pointer dots are drawn in around the circular buffer structure of replay buffer structure 254 and these are respectively denoted as: {B}, {U}, {A} and {N}. In FIG. 3A, four corresponding pointers: PtrB (381), PtrU (383), PtrA (384), and PtrN (386), are depicted within memory unit 350. FIGS. 3A-3B are to be understood as showing one possible species 300 of the generic solution provided by FIG. 2 and they are not to be construed as limiting the disclosure associated with FIG. 2.

Referring to FIG. 3A, shown is a packet switching device 300 in accordance with the disclosure. Where practical, like reference symbols and numbers in the "350" decade series are used for replay buffer elements of FIG. 3A which correspond to but are not necessarily the same as the elements represented by similar symbols and reference numbers of the "250" decade series in FIG. 2. Due to the detailed nature of FIGS. 3A-3B, various elements already described in FIG. 1 and FIG. 2 are omitted from the illustration of FIGS. 3A-3B. What is shown in FIGS. 3A-3B is an upper sub-layer portion of a Data Link layer (DL) that receives data and control signals from a TL layer bus 305 and outputs results to a lower sub-layer portion of the Data Link layer by way of bus 362. It is to be understood that device 300 may include a plurality of ingress data pipes like 110, 213' and optionally with each having a variable ingress rate. It is to be understood that device 300 may include an ingress data buffering memory like 130 or 233 where the ingress data buffering memory has its data read lines (like 244) operatively coupling to switch fabric module(s) like 150, 250 of respective FIGS. 1-2. It is to be understood that post-routing output lines of the switch fabric (not shown) of device 300 couple to a transaction layer circuit (not shown) where the latter TL part is used for attaching transaction control code to file layer code output by the switch fabric. This post transaction layer data then arrives on bus 305 of FIG. 3A and carries both TLP payload data and TLP control data in respective sub-buses. In the illustrated embodiment TLP control data is carried on sub-buses 305a and 305c while TLP payload data is carried on a parallel sub-bus 305b. Sub-buses 305b and 305c couple in parallel or on a time multiplexed basis into memory write port 393. Also in this particular embodiment, TLP payload data 305b may be supplied at an average delivery rate corresponding to a device-wide maximum bandwidth of $Ebw \geq \times 16$. (In one embodiment, the device-wide maximum bandwidth corresponds to the maximum payload bandwidth of the switch fabric 250. See FIG. 2.) In other embodiments the device-wide maximum bandwidth may be higher or lower than ×16, for example in one alternate embodiment it is $Ebw = \times 8$.) When the TLP payload data 305b enters an integrated egress/replay memory structure 350 for storage therein through write data receiving port 393, a corresponding write address is provided by way of PdBx write address bus 391 and corresponding write control signals such as write enable and write clock are provided by way of write control bus 392. In an alternate embodiment, there is only one clock signal for both read and write operations. However, for purpose of illustration it is easier here to present memory unit 350 as having independent write and read clocks wherein the write clock operates at a frequency corresponding to the device-wide maximum bandwidth (e.g., $EbW_{MAX} \geq \times 16$) and the read clock (395) operates at a frequency corresponding to a variable bandwidth (e.g., $Ebw = Var \leq EbW_{MAX}$) so as to thereby match the egress rate of a variably configured egress pipe or port (not shown). While FIG. 3A emphasizes that TLP payload data 305b is written into memory unit 350 by way of write port 393, in one embodiment various TLP control signals 305c such as relative SOF addresses (starts of packet frames), relative EOF addresses (ends of packet frames), and relative Nullify start and end addresses are also written into memory unit 350 by way of write port 393 for purpose of later transfer to a replay control module 320 by way of read port 396 and also for later transfer to egress control module 310 also by way of read port 396. Data throughput rates at write port 393 and read port 396 will typically differ from one another. In that regard, memory 350 may be viewed as a rate smoothing buffer for SOF and EOF data entries that enter via write port 393 and are later forwarded from read port 396 to the egress control module 310 and to the replay control module 320.

With regard to the data reading output port 396, a respective read address is provided to memory unit 350 by way of a PdUx/–PdAx read address bus 394 where the type of read address supplied depends on (and defines) whether the read port 396 is respectively outputting first-time play-out data (PdUx) of a packet or second-time packet data that has been first-time played out and now is being replayed as replay data (PdAx). Corresponding read control signals such as read enable and/or read clock are provided by way of read control bus 395.

The first-time play-out data (PdUx) or replay data (PdAx) ultimately exits via bus 362 for further processing by a lower sub-layer of the data link layer (not shown) of device 300. That lower sub-layer of the DL (not shown) may attach further DL code signals to packet signals output via line 362, such as sequence number codes and error check codes (i.e., a cyclic redundancy check such as LCRC32 for example). The DL-processed play-out packet signals may then move through the device's physical interface layer (PL) for encoding into a predefined serial transmission format and for output onto a physical transmission media (not shown) and subsequent receipt by a link partner (not shown). A back-pressure signal 368 (or another vacancy indicating signal) from the lower sub-layer of the DL (not shown) couples to an arbiter 330 of the illustrated circuitry for indicating to the arbiter 330 when the lower sub-layer of the DL has buffer space available for receiving more data via egress output bus 362. The arbiter 330 makes sure there is sufficient vacancy room in the lower sub-layer of the DL before allowing read address signal 394 to advance for a next block of entry data.

Referring to the buffer structure shown inside the integrated egress/replay buffer structure 350, it can be readily seen that regions 351f and 351f' correspond to the free space area 251f of FIG. 2, PdBx area 351a of FIG. 3A corresponds to the raceway section 251a of FIG. 2, PdUx area 351b corresponds to the Data-Under-Transmission area 251b of FIG. 2, and PdAx area 351d corresponds to the Data-After-Transmission area 251d of FIG. 2. A number of pointers may be used to keep track of starts and/or ends of various parts of each circular buffer (only one such circular buffer shown, although plural ones are understood to be present) in the integrated egress/replay memory unit 350. Upon start up when the buffer is empty and there is only free space 351f-351f', all pointers collapse to the position of the end-of-PdAx pointer 386 ($PTR_N$). Next as PdBx information enters for storage in the raceway area 351a, pointer 381 ($PTR_B$) separates away from the position of the end pointer $PTR_N$ (386) and pointer 381 ($PTR_B$) advances upwardly for keeping track of the latest PdBx byte(s) just written into memory. A register 315 in egress controller 310 stores a copy of the $PTR_B$ pointer (381). Yet later as some PdBx data is redefined as being PdUx data that is part of a packet being currently read out in blocks (where generally the blocks won't be read out until after a complete and validated full packet has been assembled in area 351a—the exception being a cutting through packet), additional pointers 383b ($PTR_U$), 383c (SOF3), and 384 ($PTR_A$) separate away from the position of $PTR_N$ (386) for keeping track of the current read-out span which is allocated as being the current Packet-Under-Transmission (PdUx). In one embodiment, the stored data (i.e. plural bytes) that is bounded in the address range defined between the SOF3 pointer 383c and the $PTR_U$ pointer 383b defines that portion of a full packet that has already been read out (played out for the first time) thus far. The $PTR_A$ pointer 384 points to the end of the last full packet that was defined as having been fully played out at least once to the link partner. Only when the span between the SOF3 pointer 383c and the $PTR_U$ pointer 383b defines a full packet that has been read out (played out for the first time) and has been validated as not being infected by a CRC-identified error or by another type of error does the $PTR_A$ pointer 384 pop up to the $PTR_U$ level 383b to thereby redefine the data stored between 383c (start-of-frame now under transmission) and 383b a replayable packet (a part of the PdAx area 351d). The SOF3 pointer pops up in unison with the $PTR_A$ pointer 384 so that SOF3 now points to the start-of-frame of the next packet under transmission. In one embodiment, data being read out as blocks from the PdUx area is coagulated into a parallel output word (long word) of 16 Bytes length and output as such in one clock cycle from data output port 396 (read output) of the memory unit 350. In other embodiments, the read-out block size can be smaller or larger, 4 Bytes, 8 Bytes or 32 Bytes per block for example.

When the last block of a current packet-under-transmission (PdUx) data has been read out (that is, $PTR_U$ is pointing to the end of frame of the current packet-under-transmission) then that full-packet's worth of data is redefined as PdAx data belonging to area 351d. This is done by the popping the $PTR_A$ pointer 384 to the last just-read out entry in memory 350, and causing each of SOF3 pointer 383c and $PTR_U$ pointer 383b to point to the start of frame of the next packet in the PdBx area 351a (if there is any such next packet). This has the effect of shrinking the length of the PdBx data (if any) remaining in raceway area 351a. The position of $PTR_N$ (386) generally does not advance in direction 386a until an ACK (a valid DL-level acknowledgement) is received from the link partner of the corresponding and already once-played packet. When the ACK arrives, $PTR_N$ (386) jumps to the start-of-frame (SOF1) of the next in-PdAx packet that has not yet been acknowledged by its link partner. In one embodiment, a plurality of once-played-out packets may be acknowledged simultaneously with a single ACK signal that identifies the youngest of acknowledged packets by that packet's sequence number. In such a case the amount of PdAx memory space that is simultaneously reallocated to free space (351f') can be quite large. And that in turn frees up a large amount of memory for use as raceway scratch area 351f. In one embodiment, the location of the SOF1 pointer 385 after a multi-packet acknowledge is obtained from a lookup table 324 provided within replay controller section 320. The lookup table 324 sorts its entries according to sequence numbers. Each time $PTR_N$ (386) jumps up to the new SOF1 385 of the next not yet-acknowledged but first-time already played-out packet, the amount of free space in regions 351f'-351f can increase by an amount equal to the length of just acknowledged packet or packets as measured in bytes or in short words (quadruple byte words).

As already mentioned, every so often the ingress side of the device 300 may supply a natural nullification flag to the egress circuitry where the natural nullification flag indicates that a current packet (i.e., a cutting through packet) whose data resides in raceway area 351a and whose data is already being first-time played out as PdUx data (or is about to be played out) is garbage. In such a case it is desirable to perform an early termination operation and not waste time starting to or continuing to output the data which is designated as garbage data over the link. In one embodiment, such an early termination operation comprises an effective discarding of whatever portion of the bad packet (or packets) still reside(s)

in the PdBx raceway area 351a, namely, the data stored between the PtrB pointer 381 and the $SOF_2$ pointer 382; where in the case of a cutting through packet, SOF2 and SOF3 will point to the same spot, one entry above where the PtrA pointer 384 points to. A discarding operation that discards packet data from the PdBx area 351a can include one or more of the following steps of: (a) collapsing the PtrB pointer 381 down to the level of the $SOF_2$ pointer 382 because data stored therebetween is deemed invalid; and (b) collapsing the $SOF_2$ pointer 382 and the PtrB pointer 381 both down to the level of the $SOF_3$ pointer 383c because cutting-through data stored therebetween is deemed invalid. Then, when new PdBx data is written into memory unit 350, the new PdBx data overwrites the data of the discarded packet data. As a result, the system will begin to instead play out data belonging to this overwriting next, and not-yet-nulled packet starting at the $SOF_3$ position rather than the invalidated data. In one embodiment, a copy of the SOF2 pointer 382 is kept in a register 317 of the egress controller section 310. The SOF2 memory address value is loaded into register 317 from the PdBx counter 311a via line 319b when the TLP bus 305a flags the presence of a start of frame (SOF) for a currently being written packet. In one embodiment, for purpose of early termination operations, the value of pointer 383c (SOF3) is stored in a register 318 where the latter is included within the egress controller portion 310 of device 300. Register 318 is loaded from a data distribution bus 365 whose data originates from memory read port 396. The reason why register 317 (SOF2) loads in response to bus 305a signaling an SOF while register 318 (SOF3) loads from bus 396/365 is because the respective address counters 311a and 312a of those registers 317 and 318 are operating in different time frames and usually at different throughput rates. Address counter 312a (the PdUx counter) is incrementing at the average egress output rate of the egress pipe (i.e., 264 of FIG. 2) and waiting for repeated approvals from the arbiter 330 that there is vacancy (368) in the lower DL sub-layer (to which bus 362 connects). Contrastingly, address counter 311a (the PdBx counter) can be incrementing at the higher burst speed rate of the TLP bus 305 and it is therefore not necessarily synchronized to the read-side arbiter 330. Stated otherwise, it should be remembered that the effective write clock CLK(Wrt) 392a (which may be considered as driving PdBx counter 311a) is often operating at a different, usually faster average writing rate and generally a different phase than the effective read clocks CLK(Rd) 395a,b (where the latter two signals may be considered as driving the PdUx counter 312a and the PdAx counter 321 per vacancy synchronization commands provided by the read-side arbiter 330). Although the write and read counters, 311a, 312a and 321 generally operate independently of one another and at different rates, during an early termination operation, buses 319c (ET1) and 319d (ET2) are used for sharing information between the respective write and read controllers 311, 312 and 320 as shall be detailed below. One or both of buses 319d and 319 can carry a flag to the arbiter 330 indicating that area 351b (PdUx) contains data from a currently cutting-through packet.

At least two different kinds of packet payload data can be read out from the read data output port 396 of the integrated egress/replay memory structure 350 as well as other data (relative SOF's) to be described below. The two different kinds of packet data are: (1) first time playing-out data being read from the PdUx expanding window area 351b during a first-time egress operation and (2) replay data being extracted from the PdAx area 351d during a packet data replay operation. Arbiter 330 manages the read pointers for both types of data and makes sure that there is vacancy room in the lower DL sub-layer that bus 362 feeds into. The predominant activity is that of forwarding a current PdUx block of data by supplying corresponding read address signals and associated control signals 319 from an egress read controller 312 within section 310 respectively to the PdUx/PdAx read address bus 394 and to the read control bus 395 of memory unit 350.

During an egress operation, a PdUx counter 312a inside egress controller portion 310 is stepping forward through a sequence of counts that cause the PtrU pointer 383b to advance by single steps corresponding to the current egress bandwidth (on bus 396) towards the position of the SOF2 pointer 382. When the PtrU pointer 383b catches up to a position just below the SOF2 pointer position 382, the PtrA pointer 384 is automatically popped up to the position just below the SOF2 pointer position 382 (This new PtrA position corresponds to the end of the packet whose EOF has been just detected on TLP bus 305.) Next, the SOF3 pointer 383c is automatically popped up to the SOF2 pointer position 382 and the PtrA pointer 384 is automatically popped up to the position just below. This causes the not-nullified and just fully played-out packet (PdUx) to become part of the replay section 351d.

At this stage, with the just played out packet having successfully played out for a first time without encountering a nullification flag and it having been re-designated as a valid packet inside the PdAx area 351d, the system reaches an arbitration decision point for determining what next full or partial (if cutting through) packet to read out. The arbiter 330 may now elect to begin playing out the accumulating data of the next full or partial packet residing in the PdBx raceway area 351a or the arbiter 330 may elect to begin replaying a packet residing in PdAx area 351d. In one embodiment, a request for replay (333) always has higher priority than a competing request for egress (331). Intermixed with the play out of packet data, the arbiter 330 may also cause the memory 350 to read out other kinds of data (e.g., relative SOF and EOF data that is distributed by data distributor 360 into various registers such as 318 of unit 310 and 324 of unit 320 by way of buses 365 and 363.) Generally, if there is no packet replay request, the arbiter 330 is biased towards electing to play out all packets already residing in the PdBx area 351a. At the same time that the arbiter 330 is causing already-received (and usually validated) packet data to be read out from memory read port 396 when there is room for it in the lower DL sub-layer (bus 362) and at a rate corresponding to the egress pipe bandwidth (e.g., Ebw=×2 for pipe 264), new packet data is usually being written much faster into (appended to) the PdBx area 351a at a throughput rate equal to or less than the device-wide $Ebw_{MAX}$ rate (i.e., ≧×16). The memory write-in operation is under independent control of a PdBx write counter 311a provided inside egress controller portion 310.

Detector 314 determines if pointer $PTR_U$ (383b) has advanced so as to catch up with PtrB (381) and thereby exhaust the PdBx raceway area 351a. If it has not (if $PTR_U$ does not yet equal $PTR_B$), that means there is still more first-time data to play out in the raceway area 351a. In response to detection that the $PTR_U$ minus $PTR_B$ value is not zero, the PdUx counter control unit 312 sends an egress request signal 331 to arbiter 330 asking for permission to transmit more packet data out of the PdBx raceway area 351a. The PdUx counter control unit 312 then waits for an active enable (a bus grant) 332 from the arbiter 330 before firing up the PdUx counter 312a to begin outputting a next stream of addresses, which stream can cover one or more full packets or even a cutting-through partial packet residing in PdBx area 351a up to a position just below PtrB 381.

The stream of sequential addresses output by PdUx counter 312a can be interrupted and stopped if an early termination operation is initiated due to receipt of a natural nullification flag while a cutting-through play-out operation is on going. In such a case (where an early termination occurs for a cutting-through packet) a number of different things will happen. First, detector 313 will indicate a true condition for the test, SOF2=SOF3? because SOF2 and SOF3 point to the same memory location when a cutting-through packet is present. Second, the SOF3 address stored in register 318 will be loaded into counter 312a. This has the effect of pulling the PtrU pointer 383b back down to the SOF3 level. Third, the SOF2 address stored in register 317 will be loaded into counter 311a. This has the effect of pulling the PtrB pointer 381 also back down to the SOF2=SOF3 level. New raceway incoming data will then overwrite the old and nullified cutting through data while the old and nullified cutting through data is not redefined as PdAx data, but rather is discarded.

The outputting of successive full packets from the PdBx raceway area 351a can be temporarily interrupted between such first-time playouts if a NAK is received from the link partner or the link partner does NOT send an ACK for a packet within a predefined timeout period. In that case, a replay is called for. Due to timing and data storage issues, it is desirable to preserve the output value of the PdUx counter 312a when it outputs the address of the last block in a first-time playout packet just before a potential replay begins. The PdUx counter 312a is controlled to keep advancing to the next data entry to be played out rather than dwelling on the one that was last played out. To this end, bus 312b couples to data load terminal 316c of register 316a. Register 316a is clocked at an appropriate clock cycle so as to store the last value of $PTR_U$ (383b) just prior to the beginning of the interrupting Replay operation. This way the end of packet (EOF) address of the last-fully read out first-time playout packet is preserved without having to perform mathematical calculations. After the interrupting event of a NAK or a late ACK is serviced by a complete replay, the next first-time play out operation can then be seamlessly commenced by using the data stored in register 316a and the pointer in PdUx counter 312a which has already advanced to the next data entry to be played out as first-time playout data.

More generally, arbiter 330 can be switched into performing a replay operation when replay controller section 320 receives a NAK signal over line 328a or fails to receive a timely ACK (decides a replay operation is needed due to a timeout). In that case, replay controller section 320 sends a replay request signal over line 333 to the arbiter 330. The arbiter 330 can then provide a corresponding replay enable signal over line 334 just as soon as a currently egressing packet (from PdBx are 351a) completes or if there is none egressing. When the arbiter 330 asserts the replay enable signal over line 334, the PdAx counter 321 responds by initiating a counting through of address values in PdAx area 351d. In the case of no timely ACK, the addresses swept through are from that of pointer $PTR_N$ (386) to that of the PtrA (384). In the case of a NAK from the link partner, the SOF1 pointer (385) is found in lookup table 324 and loaded into PdAx counter 321 and the latter counts from SOF1 (385) to the PtrA location (384). Immediately after the replay of a complete one or more packet finishes out of the PdAx area 351d, play out of a next complete new packet from the PdBx raceway area 351a may be seamlessly commenced because the PdUx counter 312a is already pointing one ahead of the old PTRU value saved in register 316a.

If pointer $PTR_U$ (383) catches up to pointer $PTR_B$ (381) then that means the egress engine (312) has finished playing out all the new data that has entered the front-end raceway region 351a (PdBx) of the circular buffer and there is nothing more for the egress engine (312) to do. Accordingly, the egress engine controller (312) does not send an egress request 331 to the arbiter 330 under this circumstance. If an EOF has not been received over the TLP bus 305 then the arbiter 330 will still be waiting for such an end of packet signal (EOF) to emerge from memory output bus 396 and to be signaled as such via line 335 before the arbiter enters idle mode. If the end of packet signal (EOF) has been received, then the arbiter 330 will enter idle mode and await either new data from the TLP bus 305 or a NAK from the link partner or an indication that an expected ACK has not been timely received When new payload data 305b arrives and starts to fill up the PdBx raceway area 351a, the egress write controller 311 activates its internal PdBx counter 311a while saving certain pieces of information for later use. One piece of information that controller 311 saves is the address (SOF2) of where a new incoming packet begins. The identity of this SOF2 address is flagged by an SOF indicator signal included in the TLP control stream 305a. In response, the egress write controller 311 strobes register 317 at the appropriate clock cycle to save the SOF address of the current packet that is being written into the PdBx area 351a. If a nullification flag later comes in for the current packet (as writing of that packet completes), the SOF2 address value in register 317 is reloaded into PdBx counter 311a to thereby, in essence, erase the nullified packet and begin writing the data of the next, not-nullified (the new incoming) packet from the SOF2 position (382) and upwards, thus overwriting over the nullified data.

After each write of a byte or quad-byte word, the PdBx counter 311a should be pointing to the next empty space in free space area 351f so that it is ready to immediately store the next incoming piece of payload data 305b or control data 305c as received over bus 305. However, for timing reasons, it is desirable to keep track of where the last piece of payload data was previously written and to save this information (PtrB at time of last writing) in register 315. The egress write controller 311 therefore strobes register 315 at the appropriate clock cycle when line 319b carries the PtrB address at time of a latest payload data writing so as to save this information for use by the sameness detector 314 of the PdUx address controller 312. The reason that such synchronization into register 315 is performed is because the effective write clock CLK(Wrt) 392a which can be considered as driving the PdBx counter 31 la is often operating at a different rate and generally different phase than the effective read clock CLK(Rd) 395a,b that can be considered to be driving the PdUx counter 312a.

Yet another address which the egress write controller 311 needs to keep track of is the location of the free space end pointer 386 ($PTR_N$). Signal 323 provides this information. As the write pointer 381 ($PTR_B$) advances up in direction 381a it can wrap around and hit against end pointer 386 ($PTR_N$) thus threatening to overwrite replay data 351d that has not yet been ACK'ed by the link partner. In one embodiment, and as a safety feature, write controller 311 is configured to stop the advancement of PdBx counter 311a and reload the SOF2 address from register 317 into the PdBx counter 311a so as to thereby drop an incoming packet (one incoming into raceway area 351a) if that incoming packet that threatens to overrun the bottom ($PTR_N$) of the replay storage area 351d. The replay storage area 351d is thus protected until an ACK comes back from the link partner. The PdBx counter 311a may be started up again towards incrementing the PtrB pointer 381 upwards after a post-replay ACK comes back from the link partner and the PtrN pointer 386 pops up (in direction 386a) so as to thereby create new free space 351f'-351f. Should new TLP data have come in over bus 305 during the time there is no free space, the outcome will be that the system will have dropped one or more packets (usually no more than one) out of the raceway area 351a while preserving the integrity of the data that is already in the replay buffer area 351d. The signal 323 which provides the end of free space information is supplied from the replay controller 320. (See also FIG. 3B.) A good design of device 300 will include means in the TLP layer (not shown) for preventing such an undesirable situation. A credit counter 327 (described below) is provided for communicating with the TLP layer to help prevent such an overrun case.

Although the memory write-in port 393 and memory read-out port 396 generally operate at different bandwidths, their operations may need to overlap (as mentioned above) when a cutting-through packet is being processed. In such a case, PtrB is pointing to a currently-being written, back part of the cutting-through packet while PtrU is pointing to a currently-being read-out earlier part of the same cutting-through packet. Sameness detector 313 flags the cutting-through packet condition to controller 311. If an early termination flag comes in during such a situation, and the sameness detector 313 indicates SOF2=SOF3, controller 311 responsively halts its current writing operation and copies the content of register 317 (SOF2) into counter 311a (PdBx). This has the effect of pulling the PtrB pointer 381 back down to the memory address level of the SOF2 pointer 382. The PdBx counter 311a is then ready to immediately write in the next block of new packet data (not invalidated data) into PdBx region 351a. In general, the PdBx counter 311a is pointing to the first empty spot in free space 351f, where that first empty spot will be filled with the next block of new packet data coming in from TLP sub-bus 305b.

At the same time that the write controller 311 responsively halts its own current writing operation upon receipt of an early termination flag (from bus 305) it should signal the independently operating read controller 312 to halt its reading out of the same cutting-through but defective packet. It should also signal the arbiter 330 to switch out of its current egress read-out mode. In one embodiment, these early termination synchronization operations are carried out with use of early termination lines 319c (ET1) and 319d (ET2). Upon receipt of an early-termination command over line 319c (ET1), the read controller 312 halts its internal PdUx counter 312a. It then loads the contents of register 318 into the PdUx counter 312a. This has the effect of lowering the PtrU pointer (383b) back to pointing to the SOF3 location 383c. At that time, register 316a contains a value equal to the address pointed to by PtrA (384) plus one entry, in other words, the SOF3 address value equals the PtrU address value. If PtrB next jumps ahead of PtrU, detector 314 will correctly indicate that there is new data in the raceway section 351a. Read controller 312 will ask the arbiter 330 to grant it an egress read-out session. If PtrB instead remains unchanged, then the read controller 312 will not request an egress read-out session. The arbiter 330 will remain in idle mode waiting for a DL-Ack or a DL NAK from the link partner or waiting for another activating event (i.e., failure to receive a timely ACK). The arbiter 330 is in idle mode at this stage because upon receipt of the early-termination command on line 319c (ET1), the read controller 312 not only halted its internal PdUx counter 312a, it also sent a command over line 319d (ET2) to the arbiter 330 for causing the arbiter 330 to halt its current egress read-out session and enter idle mode. When in idle mode, the arbiter 330 is ready to receive one or more new requests such as over request lines 331 and 333 and to arbitrate between them if they occur simultaneously and to then grant a read session to the winning request. (In one embodiment, an active replay request 333 always has highest priority.) After servicing a first winning request, the arbiter 330 grants a next read session to a next requestor on a round robin or other fairness-based prioritization scheme. During a granted read session, the arbiter 330 synchronizes its activities with the buffer vacancy indicating signals received from the lower DL sub-layer over line 368. In this way, the arbiter 330 protects the receiving buffer (not shown) in the lower DL sub-layer from overflowing.

It should be noted that the request lines 331 and 333 going into the arbiter 330 are not limited to carrying read-out session requests only for the purposes of first-time play-out of packet data (PdUx content) or for subsequent replay of at least once-played out packet data (PdAx content). Read-out session requests may be transmitted over request line 333 for purposes of locating special SOF, EOF and/or nullify characters and storing their respective addresses in a lookup table (LUT) 324 of FIG. 3B.

It should be further noted that the memory locations pointed to by the address values of the SOF2 (382) and SOF3 (383c) pointers are not necessarily the only start-of-frames in that memory span SOF2-SOF3. There can be plural numbers of whole packets stored in the memory span SOF2-SOF3. The PdBx raceway 351a should be designed with sufficient space to store plural whole packets because TLP bus 305 can unload a burst of such packets quickly into the PdBx raceway area 351a whereas playout bus 396 may be constrained to outputting stored packet data at a relatively much slower rate due to current thinness of the corresponding egress pipe (i.e., 264). FIG. 3A shows only the SOF2 pointer (382) and the SOF3 pointer (383c) because that part of the design needs to keep track only of the start-of-frame of the currently being read packet (occupying the span pointed to by SOF3-PtrU) and of the currently being written packet (occupying the span pointed to by SOF2-PtrB).

Referring to FIG. 3B, register 316b is essentially a copy of register 316a and stores the last value of $PTR_U$ (383b) just before an interrupting Replay operation began. In this situation, $PTR_U$ (383b) points to the end of the last block of the once played packet that was just read out. If a DL NAK comes back for any not-yet acknowledged packet (where the NAK 328a is received by controller 328), the PdAx replay counter 321a will step through the address space located between the addresses pointed to by pointers 385 (SOF1) and register 316b (whose current contents correspond to $PTR_U$ (383b) which also happens at this time to equal $PTR_A$ (384)). In this way, the PdAx replay counter 321a can quickly replay not-yet acknowledged packets residing in the replay area 351d. Output 329' of PdAx replay counter 321a couples to input 329 of arbiter 330 (FIG. 3A). SOF addresses are obtained by the replay controller 320 via lines 363' and 363" which couple to bus 363 of FIG. 3A. The obtained SOF addresses can be redistributed to the egress controller 310 by way of lines 364' (FIG. 3B), 364 (FIG. 3A), through distributor 360 and then bus 365.

Sometimes a replay condition arises that calls for replay of more than one packet at a time. For example, if a DL ACK has not been timely received for a plurality of packets stored in memory area 351d; because for example the link temporarily went down, then in one embodiment the start-of-frame for the first of the not yet acknowledged packets is obtained form a lookup table 324 held within replay controller 320'. The PdAx replay counter 321a will then step through the address space located between the addresses pointed to by SOF pointer fetched from lookup table 324 and register 316b under the assumption that the link went down during the entire time and thus all the packets in that range need to be replayed.

If a DL ACK is timely received for one or more packets (where in this embodiment the one or more packets includes the packet whose start-of-frame is pointed to by the PtrN pointer 386 of FIG. 3A), then a reallocation of replay buffer area to free space 351f' is performed. Address register 327a (in controller 327) stores the current PtrN value. Line 323 couples the PtrN signal to unit 311 of FIG. 3A. Line 324a feeds the current PtrN signal value into address register 327a from lookup table 324. Controller 327 further contains a credit counter whose output 327b couples to the dispatch scheduler (see 270 of FIG. 2) of device 300. The credit count tells the dispatch scheduler how much free space is presently available in memory area 351f'-351f. When replay buffer area is reallocated to free space 351f' because the packets stored in that replay buffer area have been affirmatively acknowledged (ACK'd) by the link partner, the value stored into address register 327a is bumped up to the start-of-frame of the next packet that has not yet been affirmatively acknowledged (ACK'd). That new PtrN value comes from lookup table 324 by way of line 324a.

Data distributor 360 of FIG. 3A does more than just distribute data read out from memory bus 396 to further buses 362, 363 and 365. One of its functions is that of detecting special characters such as SOF characters and EOF characters appearing on memory output bus 396. If distributor 360 detects an SOF character on bus 396, the distributor 360 responsively causes a corresponding read address that had been output on PdUx counter line 321b/319 (corresponding to the detected SOF character) to be copied via lines 335 and 363/363" into the SOF lookup table 324 of FIG. 3B. In this way the lookup table 324 is able to capture the memory addresses of various TLP control signals including the start-of-frame addresses (SOF's) of all valid packets stored in memory 350 (stored both in the PdAx area and the PdUx area). These memory addresses (which could be absolute or relative) are initially established by the PdBx counter 311a when the corresponding SOF or other special packet framing characters appear on TLP bus 305 and are written into memory 350 via write port 393. Later, when the PdUx counter addresses the same memory location and causes the SOF or other special packet framing character to re-appear on the memory read bus 396, the data distributor captures the corresponding output of the PdUx counter 312a from line 335 (which couples via the arbiter to line 319) and distributes the captured address signal via line 363" (FIG. 3B) for storage into lookup table 324. A lookup table write controller 326 manages where in the lookup table 324 these various captured addresses (363") will be written. In one embodiment, the write controller 326 sorts the to-be-written data according to unique packet sequence numbers associated with their respective packets. Details regarding this process extend beyond the scope of the present disclosure. It is sufficient for purposes of this disclosure simply to note that any appropriate means may be used for keeping track of where in lookup table 324, the start-of-frame address of a given packet is stored where the given packet may be identified by any of a variety of equally usable techniques.

A read controller 325 is further provided in replay controller module 320' for reading out the stored SOF address signals from lookup table 324 in accordance with an appropriate packet identifying technique. One of the SOF address signals loadable into PdAx counter 321a from lookup memory 324 is the SOF1 address (385). Another is the PtrN address value (386) which is also loadable into register 327a from lookup memory 324. Loading of one or the other of SOF1 and PtrN (or of another SOF address stored in lookup memory 324) into the PdAx counter 321a allows the PdAx counter 321a to begin a replay count out starting at the earliest part of the one or more packets (e.g., the one starting at SOF1) that is deemed as needing to be replayed at the moment. The halt of count address (PtrA) comes from register 316b into sameness detector 336 who's other input couples to line 329' and whose output couples to a stop terminal of control module 321'. In one embodiment, if no DL ACK's are received within a predefined timeout, the lookup memory 324 loads the PtrN start-of-frame address into PdAx counter 321a and thereby allows the PdAx counter 321a to begin a replay count out starting at the earliest part of a contiguous plurality of packets that have not been timely acknowledged where the plurality includes the last played out whole packet (385-384). The stop terminal (the output of sameness detector 336) also couples to the replay request line 333' for blocking assertion of replay requests once the address on counter output 329' equal the PtrA value output by register 316b.

When a data-link layer acknowledge signal (DL ACK) or negative acknowledge (DL NAK) signal comes in via bus 328a, the ACK or NAK indicates which one or more of the once-played packets it covers among the packets stored in replay area 351d. If it is a DL NAK, the lookup table 324, if necessary, forwards the corresponding SOF address signal into PdAx counter 321a. Additional signals are coupled into replay address controller 321' by way of bus 363'. These are SOF, EOF and various notification signals that have been stored in memory 350 at the time of their receipt on TLP bus 305. As mentioned the special optical framing characters (i.e., SOF, EOF) are detected by distributor 360 when they are read out from memory 350 and their corresponding addresses are fed through lines 312b, 319, through the arbiter 330, through line 335 and through the distributor 360 into bus 363 when the replay controller 320 is ready to use them. One of the memory stored notifications that is fed into controller 320 by way of bus 363' is a so-called late error notification which occurs when a soft error is detected in memory 350 after a given packet had been stored into memory 350 but experiences a soft storage error. Packets with soft-errors are not replayed but are instead purged out of the replay buffer area 351d in a manner similar to how acknowledged (ACK'd) packets are purged. This level of hyper detail is not needed here however for understanding the primary thrust of the present disclosure which deals with how the fast raceway section 351a is integrated with the replay buffer storing area 351d and how the two cooperate with one another. Bus 328a couples control signals from the ACK/NAK purge controller 328 to units 327 and 321'. The control signals (328a) indicate whether and when respective ACK or NAK or lack-of-timely ACK events occur.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. An integrated egress/replay memory structure disposed within a network device where the network device has one or more egress pipes with respective reconfigurable egress data bandwidths, said integrated egress/replay memory structure comprising:
   (a) a first packet data storage area for storing first-time playout data (PdUx) of a first packet that is subject to being played out for a first time from the memory structure for corresponding first time transmission toward a link partner through a corresponding first egress pipe of the network device where the first egress pipe has a configurably defined first egress data bandwidth and where upon being played out from the first storage area for the corresponding first time transmission toward the link partner, the first-time playout data (PdUx) is played out from the first storage area at an average first rate corresponding to the configurably defined first egress data bandwidth;
   (b) a second packet data storage area for storing second packet data (PdAx) that has been at least once transmitted via the first egress pipe as said first-time playout data (PdUx) but is subject to possibly being replayed through the first egress pipe at least one more time and at said average first rate corresponding to said predefined first egress data bandwidth; and
   (c) a third packet data storage area for storing third data (PdBx) of one or more packets that have not yet been transmitted wholly as said first-time playout data (PdUx), where the third data (PdBx) can be written and added to the third storage area at an average second rate corresponding to a raceway bandwidth that is no less than a predefined largest configurable value usable in the device for said first egress data bandwidth.

2. The integrated egress/replay memory structure of claim 1 wherein:
   (c.1) said raceway bandwidth is greater than said predefined largest configurable value usable in the device for said first egress data bandwidth.

3. The integrated egress/replay memory structure of claim 1 wherein:
   (c.1) said raceway bandwidth is larger than a predefined maximum egress data bandwidth attainable by any one or more of said reconfigurable egress pipes of the network device.

4. The integrated egress/replay memory structure of claim 1 wherein said network device includes at least one of a switch fabric or a data processing unit having a predefined maximum instantaneous bandwidth for outputting data and wherein:
   (c.1) said raceway bandwidth is at least as large as the predefined maximum instantaneous bandwidth.

5. The integrated egress/replay memory structure of claim 1 wherein:
   (a.1) said first packet data storage area is defined by at least first and second movable pointer signals, the first pointer signal (PtrU) pointing to a most recently played out portion of a the first-time playout data (PdUx) and the second pointer signal (SOF3) pointing to an earliest played out portion of the first-time playout data (PdUx); and where
   said integrated egress/replay memory structure further comprises:
   (d) a first counter that generates the first pointer signal (PtrU); and
   (e) a first register that stores the second pointer signal (SOF3), where the first register is operatively coupled to the first counter for loading the second pointer signal (SOF3) into the first counter and thereby causing the first pointer signal (PtrU) to coincide with the second pointer signal (SOF3).

6. The integrated egress/replay memory structure of claim 5 and further comprising:
   (f) early termination reporting means for detecting if packet data being written into said third packet data storage area has been flagged as invalid by an error checking unit and for outputting an early termination signal reporting said invalid status;
   (d.1) wherein the first counter is responsive to the early termination signal and loads with said second pointer signal of the first register in response to the early termination signal reporting an invalid status.

7. The integrated egress/replay memory structure of claim 5 wherein:
   (b.1) said second packet data storage area is defined by at least third and fourth movable pointer signals, the third pointer signal (PtrA) pointing to an end portion of a complete packet that has been most recently played out as first-time playout data (PdUx) and the fourth pointer signal (SOF1) pointing to an earliest played out portion of the complete packet that has been most recently played out; and where
   said integrated egress/replay memory structure further comprises:
   (f) a second counter that can use the fourth pointer signal (SOF1) as a start pointer for performing a replay readout operation from the second packet data storage area; and (g) a pointer memory that stores the fourth pointer signal (SOF1), where the pointer memory is operatively coupled to the second counter for loading the fourth pointer signal (SOF1) into the second counter.

8. The integrated egress/replay memory structure of claim 7 and further comprising:
(h) a second register that stores the third pointer signal (PtrA), where the second register is operatively coupled to the second counter for halting a counting operation of the second counter when an output of the second counter coincides with the third pointer signal (PtrA).

9. The integrated egress/replay memory structure of claim 7 wherein:
(c.1) said third packet data storage area is defined by at least fifth and sixth movable pointer signals, the fifth pointer signal (PtrB) pointing to a free space memory entry area immediately adjacent to a most recently written portion of a packet is being currently written into the third packet data storage area and the sixth pointer signal (SOF2) pointing to a most recently but not yet played out portion of the packet that is being currently written into the third packet data storage area; and where
said integrated egress/replay memory structure further comprises:
(h) a third counter that updates said fifth pointer signal (PtrB) to point to a next free space memory entry area after new packet data is written into free space memory entry area previously pointed to by the fifth pointer signal (PtrB); and
(i) a second register that stores the sixth pointer signal (SOF2), where the second register is operatively coupled to the third counter for resetting the address value held in the third counter to that of the sixth pointer signal (SOF2) at least in response to an indication that a currently being written packet is invalid.

10. The integrated egress/replay memory structure of claim 9 and further comprising:
(j) a third register that stores a previous value output by the third counter and representing a last address written within the third packet data storage area; and
(k) a fourth register that stores a previous value output by the first counter and representing a last address read out from in the first packet data storage area; and
(l) a first sameness detector that detects if the values stored in the third and fourth registers represent a same address.

11. The integrated egress/replay memory structure of claim 10 and further comprising:
(m) a fifth register that stores a value representing said sixth pointer signal (SOF2); and
(n) a second sameness detector that detects if the value stored in the fifth register represents a same address as the value stored in the first register.

12. The integrated egress/replay memory structure of claim 9 and further comprising:
(j) a fourth storage area that is free and thus available for being written into with new third data (PdBx) at said average second rate corresponding to a raceway bandwidth; and where
said integrated egress/replay memory structure further comprises:
(k) a third register that stores a seventh pointer signal (PtrN) defining an end point of the fourth storage area, the third register being operatively coupled to the third counter for preventing the third counter from updating said fifth pointer signal (PtrB) to point to a memory area beyond said end point and thus outside the fourth storage area.

13. The integrated egress/replay memory structure of claim 1 wherein:
(b.1) said second packet data storage area is defined by at least first and second movable pointer signals, the first pointer signal (PtrA) pointing to a back portion of a complete packet that has been most recently played out as first-time playout data and the second pointer signal (SOF1) pointing to a front portion of the complete packet that has been most recently played out; and where
said integrated egress/replay memory structure further comprises:
(d) a first counter that can use the second pointer signal (SOF1); as a start pointer for performing a replay read-out operation from the second packet data storage area; and
(e) a pointer memory that stores the second pointer signal (SOF1), where the pointer memory is operatively coupled to the first counter for loading the second pointer signal (SOF1) into the first counter.

14. The integrated egress/replay memory structure of claim 13 and further comprising:
(f) a first register that stores the first pointer signal (PtrA), where the first register is operatively coupled to the first counter for halting a counting operation of the first counter when an output of the first counter coincides with the first pointer signal (PtrA).

15. The integrated egress/replay memory structure of claim 1 wherein:
(c.1) said third packet data storage area is defined by at least first and second movable pointer signals, the first pointer signal (PtrB) pointing to a free space memory entry area immediately adjacent to a most recently written portion of a packet is being currently written into the third packet data storage area and the second pointer signal (SOF2) pointing to a most recently but not yet played out portion of the packet that is being currently written into the third packet data storage area; and where
said integrated egress/replay memory structure further comprises:
(d) a first counter that updates said first pointer signal (PtrB) to point to a next free space memory entry area after new packet data is written into free space memory entry area previously pointed to by the first pointer signal; and
(e) a first register that stores the second pointer signal (SOF2), where the first register is operatively coupled to the first counter for resetting the address value held in the first counter to that of the second pointer signal (SOF2) at least in response to an indication that a currently being written packet is invalid.

16. The integrated egress/replay memory structure of claim 15 and further comprising:
(f) a second register that stores a previous value output by the first counter and representing a last address written within the third packet data storage area; and
(g) a third register that stores a value representing a last address read out from in the first packet data storage area; and
(h) a first sameness detector that detects if the values stored in the second and third registers represent a same address.

17. The integrated egress/replay memory structure of claim 1 wherein the first through third packet data storage areas are within a multi-ported memory unit having separate read and write controls, the memory structure further comprising:
(d) an arbiter operatively coupled to a read control of said multi-ported memory unit for controlling when data will be read out from a respective one of said first through third packet data storage areas.

18. The integrated egress/replay memory structure of claim 17 wherein:
(d.1) the arbiter is responsive to a vacancy signal supplied from a downstream unit and indicating that the downstream unit has room to receive data read out from the multi-ported memory unit.

19. The integrated egress/replay memory structure of claim 17 wherein:
(d.1) the arbiter is responsive to an indication that the first packet data storage area is not empty.

20. The integrated egress/replay memory structure of claim 17 wherein:
(d.1) the arbiter is responsive to an indication that the first packet data storage area contains data from a cutting-through packet.

21. The integrated egress/replay memory structure of claim 17 wherein:
(d.1) the arbiter is responsive to an early termination indication that the third packet data storage area contains data from a cutting-through packet that has been invalidated.

22. The integrated egress/replay memory structure of claim 21 wherein:
(d.1a) the early termination indication is generated in response to an error check flag being received at said average second rate corresponding to the raceway bandwidth and indicating an error check error.

23. A network device comprising:
(a) a plurality of reconfigurable egress pipes having respective reconfigurable egress data bandwidths;
(b) a plurality of integrated play/replay memory structures each operatively coupled to a respective one of the reconfigurable egress pipes, where each integrated play/replay memory structure has a plurality of memory sections including:
(b.1) a raceway memory section that can receive write data for storage into the raceway memory section at a first data throughput rate corresponding to a raceway bandwidth;
(b.2) an under-transmission memory section that can hold first-time play data that is being read out of the under-transmission memory section at a second data throughput rate corresponding to a second bandwidth, where the second bandwidth is variable and has a variably defined egress bandwidth associated therewith;
(b.3) an after-transmission memory section that can hold once-played-out data that has already been read out at least once from the integrated play/replay memory structure, where the once-played-out data can be read out from the after-transmission memory section one or more additional times at said second data throughput rate if replay of such data is called for; and
(b.4) a free space memory section that is interposed between the after-transmission memory section and the raceway memory section and has memory capacity that is allocatable to either one of the after-transmission memory section and the raceway memory section;
where said raceway bandwidth is at least as large as a largest egress data bandwidth at which one of said plurality of reconfigurable egress pipes can be reconfigured to operate at.

24. The network device of claim 23 wherein:
(b.1a) said raceway bandwidth is at least as large as a largest instantaneous bandwidth at which a third data can be supplied to the corresponding integrated play/replay memory structure from an upstream data supplying unit that is coupled to the corresponding integrated play/replay memory structure.

25. The network device of claim 23 wherein:
(a.1) said reconfigurable egress data bandwidths of the egress pipes are limited to a predefined maximum egress bandwidth;
(b.1) said raceway bandwidth is at least as large as the predefined maximum egress bandwidth.

26. A method of managing a network device having egress pipes with reconfigurable egress data bandwidths, said method comprising:
(a) maintaining in a first storage area of an integrated egress/replay memory unit, first data (PdUx) that is subject to current read out and current transmission through a corresponding egress pipe having a predefined first egress data bandwidth;
(b) maintaining in a second storage area of the integrated egress/replay memory unit, second data (PdAx) that has been once transmitted as said first data (PdUx) but is subject to being read out for replay through the corresponding egress pipe at said predefined egress data bandwidth;
(c) storing into a third storage area of the integrated egress/replay memory unit, third data (PdBx) that has not yet been once transmitted as said first data (PdUx), where said storing of the third data (PdBx) is carried out at a raceway bandwidth greater than said first egress data bandwidth; and
(d) maintaining a fourth storage area of the integrated egress/replay memory unit, interposed between the second and third storage areas where the fourth storage area constitutes free space into which the third storage area can grow and to which the second storage area can contribute additional space no longer needed by the second storage area.

27. The method of claim 26 where said raceway bandwidth is at least as large as a maximum reconfigurable egress data bandwidth to which one of said egress pipes can be configured to.

28. The method of claim 26 where said raceway bandwidth is at least as large as a maximum instantaneous data supplying bandwidth at which a data supplying unit upstream of the third storage area can supply data for writing into the third storage area.

29. The method of claim 26 wherein:
(d.1) said additional space is no longer needed by the second storage area when a downstream device has acknowledged valid receipt of data contained in the additional space.

* * * * *